(12) United States Patent
Abe et al.

(10) Patent No.: US 6,173,253 B1
(45) Date of Patent: Jan. 9, 2001

(54) SENTENCE PROCESSING APPARATUS AND METHOD THEREOF,UTILIZING DICTIONARIES TO INTERPOLATE ELLIPTIC CHARACTERS OR SYMBOLS

(75) Inventors: Keiko Abe, Hitachi; Soshiro Kuzunuki, Hitachinaka; Koyo Katsura; Toshimi Yokota, both of Hitachiota; Masaki Miura, Hitachi, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/275,025

(22) Filed: Mar. 24, 1999

(30) Foreign Application Priority Data

Mar. 30, 1998 (JP) .................................................. 10-083206

(51) Int. Cl.⁷ ............................. G06F 17/24; G06F 17/21
(52) U.S. Cl. ................................ 704/10; 704/9; 707/532; 707/541
(58) Field of Search .................................. 704/10, 9, 8, 1, 704/2, 3, 7, 257, 251, 252, 255, 270; 707/531, 532, 533, 534, 541; 434/169, 162, 163, 164, 165, 156, 159

(56) References Cited

U.S. PATENT DOCUMENTS

| | | | |
|---|---|---|---|
| 5,321,608 | * | 6/1994 | Namba et al. ........................ 704/257 |
| 5,490,061 | * | 2/1996 | Tolin et al. ............................... 704/9 |
| 5,734,889 | * | 3/1998 | Yamaguchi et al. ..................... 704/9 |
| 5,761,637 | * | 6/1998 | Chino ................................... 382/186 |
| 5,799,276 | * | 8/1998 | Komissarchik et al. ................. 704/9 |
| 5,828,991 | * | 10/1998 | Skiena et al. ........................ 704/251 |
| 5,933,525 | * | 8/1999 | Makhoul et al. .................... 704/231 |
| 5,960,385 | * | 9/1999 | Skiena et al. ............................. 707/4 |
| 5,966,686 | * | 10/1999 | Heidorn et al. .......................... 704/2 |
| 5,991,721 | * | 11/1999 | Asano et al. ............................. 704/9 |

FOREIGN PATENT DOCUMENTS 40-2016671A * 1/1990 (JP) .
40-5225175A * 9/1993 (JP) .

OTHER PUBLICATIONS

DAILOG File 275, Acc. No. 01288595: Sheryl R. Young, et al.: "High Level Knowledge Sources in Usable Speech Recognition Systems", Communications of the ACM, vol. 32, No. 2, pp. 183 (12), Feb. 1989.*
DIALOG File 275, Acc. No. 01523808: Ellen Germain: "Introducing Natural Language Processing" (Tutorial); AI Expert, vol. 7, No. 8, pp. 30 (6), Aug. 1992.*

* cited by examiner

Primary Examiner—Joseph Thomas
(74) Attorney, Agent, or Firm—Antonelli, Terry, Stout & Kraus, LLP

(57) ABSTRACT

A document or sentence processing apparatus having an input unit for inputting characters, a display unit for displaying input characters and a processing unit for converting and editing the input characters, in which the processing unit has a candidate word extraction unit which extracts candidates for the words with their characters omitted and/or omitted words themselves by referring to the vocabulary dictionary storing words and their usage frequency, to the dictionary of transition between words defining the information on the transition between words and the probability of the transition between words, and by searching the characters before and after the elliptic character included in the input sentence into the vocabulary dictionary, and a determination unit which selects a single word among the extracted candidate words by referring to the dictionary of transition between words.

6 Claims, 21 Drawing Sheets

FIG.4
EXAMPLE OF POSTPROCESSING OF MORPHOLOGICAL ANALYSIS (1) · IF "NOUN" — "NOUN" →THEN "COMPOUND NOUN"
　　　EX. 文字 (NOUN) →認識 (NOUN) →文字認識 (COMPOUND NOUN)
　· IF "SA-SERIES IRREGULAR CONJUGATION VERB" — "する"
　　　(SA-SERIES IRREGULAR CONJUGATION VERB) →THEN "COMPOUND VERB"
　　　EX. →認識 (SA-SERIES IRREGULAR CONJUGATION VERB)
　　　　　 —する (SA-SERIES IRREGULAR CONJUGATION VERB)
　　　　　 →認識する
　　　　　　(SA-SERIES IRREGULAR CONJUGATION COMPOUND VERB)

(2) · IF "POSTPOSITIONAL WORD" OR "AUXILIARY WORD",
　　　　　　　　　　　　　　　　　　　　→THEN COMPOUND WORD
　　　EX. 文字　認識　の　開発
　　　　　　　　　　(AUXILIARY
　　　　　　　　　　　WORD)
　　　　→文字認識　の　開発
　　　　・ ・ ・ ・　　　・ ・

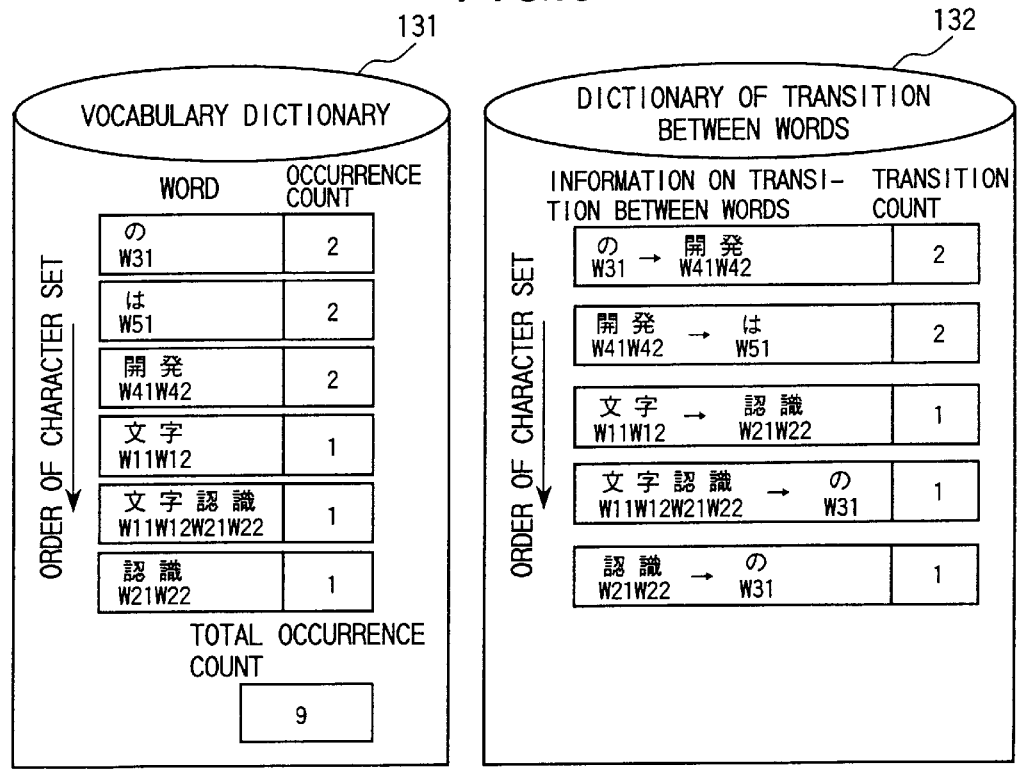

CANDIDATE WORDS WITH INTERPOLATED CHARACTERS

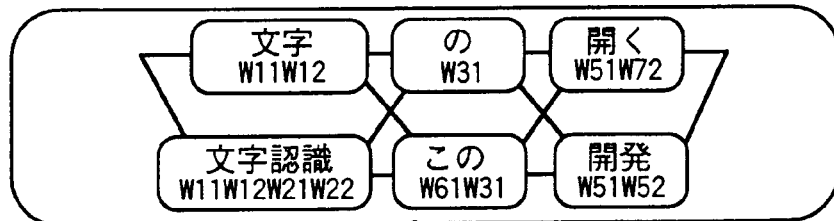

JUDGEMENT OF SENTENCES CONSTRUCTED WITH OPTIMAL INTERPOLATION — 103

| No. | COMBINATION OF CANDIDATE WORDS | | | OCCURRENCE PROBABILITY |
|---|---|---|---|---|
| No.1 | 文字<br>W11W12 | の<br>W31 | 開く<br>W51W72 | 278×10⁻⁸ |
| No.2 | 文字<br>W11W12 | の<br>W31 | 開発<br>W51W52 | 557×10⁻⁸ |
| No.3 | 文字<br>W11W12 | この<br>W61W31 | 開く<br>W51W72 | 113×10⁻⁸ |
| No.4 | 文字<br>W11W12 | この<br>W61W31 | 開発<br>W51W52 | 128×10⁻⁸ |
| No.5 | 文字認識<br>W11W12W21W22 | の<br>W31 | 開く<br>W51W72 | 387×10⁻⁸ |
| No.6 | 文字認識<br>W11W12W21W22 | の<br>W31 | 開発<br>W51W52 | 1228×10⁻⁸ |
| No.7 | 文字認識<br>W11W12W21W22 | この<br>W61W31 | 開く<br>W51W72 | 277×10⁻⁸ |
| No.8 | 文字認識<br>W11W12W21W22 | この<br>W61W31 | 開発<br>W51W52 | 376×10⁻⁸ |

SENTENCE GENERATED WITH OPTIMAL INTERPOLATION

OPTIMAL PATH

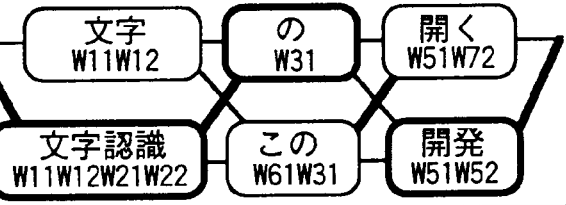

FIG.14

DICTIONARY LEARNING [SEQUENTIAL NORMALIZATION]

- VOCABULARY DICTIONARY
  - WORD TO BE LEARNED (WORD APPEARED IN THE USER-DEFINED SENTENCE)
    (OCCURRENCE COUNT AFTER LEARNING) =
    ((OCCURRENCE COUNT BEFORE LEARNING) + $\alpha$) $\times \frac{S}{S+\alpha}$ (TOTAL OCCURRENCE COUNT AFTER LEARNING) =
    ((TOTAL OCCURRENCE COUNT BEFORE LEARNING) + $\alpha \times n$) $\times \frac{S}{S+\alpha}$

- WORD NOT TO BE LEARNED (WORD NOT APPEARED IN THE USER-DEFINED SENTENCE)
    (OCCURRENCE COUNT AFTER NORMALIZATION) =
    (OCCURRENCE COUNT BEFORE NORMALIZATION) $\times \frac{S}{S+\alpha}$

- DICTIONARY OF TRANSITION BETWEEN WORDS
  - TRANSITION BETWEEN WORDS TO BE LEARNED (TRANSITION BETWEEN WORDS APPEARED IN THE USER DEFINED SENTENCE)
    (TRANSITION COUNT AFTER LEARNING) =
    ((TRANSITION COUNT BEFORE LEARNING) + $\alpha$) $\times \frac{T}{T+\alpha}$

- TRANSITION BETWEEN WORDS NOT TO BE LEARNED (TRANSITION BETWEEN WORDS NOT APPEARED IN THE USER-DEFINED SENTENCE)
    (TARNSITION COUNT AFTER NORMALIZATION) =
    (TRANSITION COUNT BEFORE NORMALIZATION) $\times \frac{T}{T+\alpha}$

[S: MAXIMUM NUMBER FOR ENABLING TO STORE THE OCCURRENCE COUNT]
  [T: MAXIMUM NUMBER FOR ENABLING TO STORE THE TRANSITION COUNT]

FIG. 15

DICTIONARY LEARNING [NORMALIZATION]

(1) IN NORMAL CASE NORMALIZATION (NOT EXCESSING THE WHICH DOES NOT REQUIRE RANGE FOR ENABLING TO STORE THE COUNT)

● VOCABULARY DICTIONARY
- WORD TO BE LEARNED (WORD APPEARED IN THE USER-DEFINED SENTENCE)
  (OCCURRENCE COUNT AFTER LEARNING)=
  (OCCURRENCE COUNT BEFORE LEARNING)+$\alpha$
  (TOTAL OCCURRENCE COUNT AFTER LEARNING)=
  (TOTAL OCCURRENCE COUNT BEFORE LEARNING)+$\alpha \times n$ ● DICTIONARY OF TRANSITION BETWEEN WORDS
- TRANSITION BETWEEN WORDS TO BE LEARNED (TRANSITION BETWEEN WORDS APPEARED IN THE USER DEFINED SENTENCE)
  (TRANSITION COUNT AFTER LEARNING)=
  (TRANSITION COUNT BEFORE LEARNING)+$\alpha$ (2) IN THE CASE WHICH REQUIRES NORMALIZATION (ALMOST EXCESSING THE RANGE FOR ENABLING TO STORE THE COUNT)

● VOCABULARY DICTIONARY
- WORD TO BE LEARNED (WORD APPEARED IN THE USER-DEFINED SENTENCE)
  (OCCURRENCE COUNT AFTER LEARNING)=
  ((OCCURRENCE COUNT BEFORE LEARNING)+$\alpha$)$\times W$ (TOTAL OCCURRENCE COUNT AFTER LEARNING)=
  ((TOTAL OCCURRENCE COUNT BEFORE LEARNING)+$\alpha \times n$)$\times W$

- WORD NOT TO BE LEARNED (WORD NOT APPEARED IN THE USER-DEFINED SENTENCE)

(OCCURRENCE COUNT AFTER NORMALIZATION)=
  (OCCURRENCE COUNT BEFORE NORMALIZATION)$\times W$ ● DICTIONARY OF TRANSITION BETWEEN WORDS
- TRANSITION BETWEEN WORDS TO BE LEARNED (TRANSITION BETWEEN WORDS APPEARED IN THE USER DEFINED SENTENCE)
  (TRANSITION COUNT AFTER LEARNING)=
  ((TRANSITION COUNT BEFORE LEARNING)+$\alpha$)$\times W$
- TRANSITION BETWEEN WORDS NOT TO BE LEARNED (TRANSITION BETWEEN WORDS NOT APPEARED IN THE USER-DEFINED SENTENCE)
  (TARNSITION COUNT AFTER NORMALIZATION)=
  (TRANSITION COUNT BEFORE NORMALIZATION)$\times W$

(1) DISPLAYING WORDS WITH INTERPOLATED CHARACTERS

| ペ | 〜 | イ | 〜 | ス |
|---|---|---|---|---|
| P11 | 〜 | P31 | 〜 | P44 |

| ペン | インタフェース |
|---|---|
| P11P12 | P31P32P43P44P45P46P47 |

↓

(2) DISPLAYING CANDIDATE WORDS

| ペ | 〜 | イ | 〜 | ス |
|---|---|---|---|---|
| P11 | 〜 | P31 | 〜 | P44 |

| ペン | インタフェース |
|---|---|
| P11P12 | P31P32P43P44P45P46P47 |

| インク | ソース |
|---|---|
| P31P32P33 | P51P46P47 |
| インタフェース | インタフェース |
| P31P32P43P44P45P46P47 | P31P32P43P44P45P46P47 |
| インタフェース | |
| P31P32P43P44P45P46P47 | |

↓

(3) ALLOWING THE USER TO SELLECT ONE OF CANDIDATE WORDS

| ペ | 〜 | イ | 〜 | ス |
|---|---|---|---|---|
| P11 | 〜 | P31 | 〜 | P44 |

| ペン | インタフェース |
|---|---|
| P11P12 | P31P32P43P44P45P46P47 |

| インク | ソース |
|---|---|
| P31P32P33 | P51P46P47 |
| インタフェース | インタフェース |
| P31P32P43P44P45P46P47 | P31P32P43P44P45P46P47 |
| インタフェース | |
| P31P32P43P44P45P46P47 | |

↓

(4) DISPLAYING THE RESULT AND LEARNING

| ペ | 〜 | イ | 〜 | ス |
|---|---|---|---|---|
| P11 | 〜 | P31 | 〜 | P44 |

| ペン | インク | インタフェース |
|---|---|---|
| P11P12 | P31P32P33 | P31P32P43P44P45P46P47 |

SENTENCE PROCESSING APPARATUS AND METHOD THEREOF, UTILIZING DICTIONARIES TO INTERPOLATE ELLIPTIC CHARACTERS OR SYMBOLS

BACKGROUND OF THE INVENTION

The present invention relates to an apparatus for allowing a user to input long words in a sentence in terms of elliptic characters without disturbing the continuity of thought. The apparatus according to the present invention is beneficial for increasing the speed and operability of inputting characters by way of a keyboard. It is also applicable for effecting an increase in the input speed when using handwritten character recognition or speech recognition and contributes to the increase in operability of the equipment.

When inputting sentences using a word processor, it is often experienced that words related to private affairs, such as a job and a hobby and to a person's own name are repeatedly input. Especially in a case where those often-used character strings are long, it is a burden for the user to input repeatedly identical, long character strings.

When using an apparatus which allows the user to input words by handwriting with a pen and tablet, since false recognition of characters input by the user may occur, the user has an increased burden in a case in which he or she inputs those characters and long sentences repeatedly.

There is an apparatus that allows the user to input characters or sentences portions omitted partially in order to reduce the user's burden.

For example, in Japanese Patent Application Laid-Open Number 7-191986 (1995) a technology which is disclosed which predicts an intended word and interpolates omitted characters by referring to memories storing syntax coding rules and word usage examples, when the user inputs a sentence including words with omitted characters. On the other hand, in Japanese Patent Application Laid-Open Number 5-28180 (1993) a technology is disclosed which prepares a table storing combinations of adjacent words, such as noun class—verb class and verb class—verbal phrase, and interpolates omitted characters and predicts an intended word by using this table.

As shown in the conventional technologies described above, word-to-word relation information between adjacent words is required to interpolate a sentence including omitted characters. For example, m syntax coding rules and word usage examples are used as this information in Japanese Patent Application Laid-Open Number 7-191986 (1995), and combinations of adjacent words are used as this information in Japanese Patent Application Laid-Open Number 5-28180 (1993).

It is, however, necessary to prepare such word-to-word relation information by referring to a vast amount of reference sentences, and it is not easy to prepare this information only by manual work.

The conventional technologies described above assume that a single word or character in a sentence is omitted, and does not mention the case that a sentence with plural words and/or characters omitted is interpolated.

SUMMARY OF THE INVENTION

An object of the present invention is to provide an apparatus for interpolating a sentence in which plural words and/or characters are omitted.

Another object of the present invention is to provide an apparatus for extracting word-to-word relation information automatically and for preparing a dictionary.

The above object can be attained by a document or sentence processing apparatus having an input unit for inputting characters, a display unit for displaying input characters and a processing unit for converting and editing the input characters, in which the processing unit includes a candidate word extraction means which extracts candidates for the words with their characters omitted and/or omitted words themselves by referring to a vocabulary dictionary storing words and their usage frequency, to a dictionary of the transition between words defining information on the transition between words and the probability of the transition between words, and by searching the characters before and after the elliptic character included in the input sentence into an vocabulary dictionary, and a determination means which selects a single word among the extracted candidate words by referring to the dictionary of transition between words.

The above object can be attained by steps including a step of decomposing the input sentence into single words and storing coordinated pairs of the individual word and its occurrence count, a step of searching the class of the particle for the individual word and storing the count of transition between words into the transition dictionary, a step of extracting candidates for the words with their characters omitted and/or omitted words themselves by focusing on the characters before and after an elliptic character included in the input sentence and searching the vocabulary dictionary, a step of selecting a single word among the extracted candidate words by referring to the dictionary of transition between words, and a step of modifying the occurrence count of the selected word and modifying the transition dictionary on the basis of the information on transition between words in case the selected word is found in the vocabulary dictionary.

BRIEF DESCRIPTION OF THE DRAWINGS

By way of example and to make the description more clear, reference is made to the accompanying drawings in which:

FIG. 4 is a table which shows rules for building the dictionary.

FIG. 5 is a diagram which shows examples of the vocabulary dictionary and the transition dictionary.

FIG. 9 is a flowchart of the optimal candidate determination process.

FIG. 14 is a table which shows rules for learning words for the dictionary.

FIG. 15 is a table which shows rules for learning words for the dictionary.

FIG. 18 is a diagram which shows a scheme for selection of candidates.

PREFERRED EMBODIMENTS OF THE INVENTION

In this embodiment, what is explained is an elliptic sentence interpolation and recognition apparatus which extracts elliptic characters in a case in which a sentence is input with some of its characters and/or words omitted, and which completes the sentence by interpolating the omitted words, and generates the dictionary for word interpolation and learns words for the dictionary.

According to the following, an apparatus in this embodiment will be described with reference to the drawings.

Figure 23:
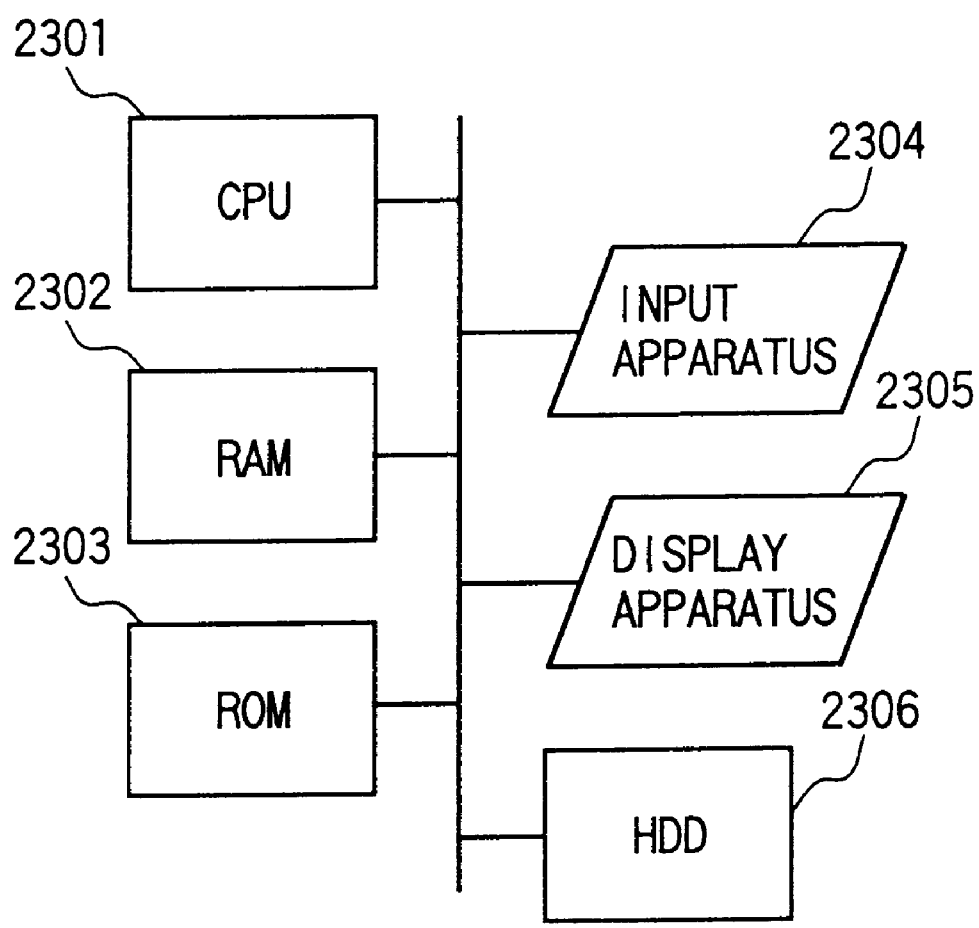
FIG. 23 is a block diagram which shows an overall configuration of the present invention.

FIG. 23 shows the overall configuration of an elliptic sentence interpolation and recognition apparatus. The component 2301 is a CPU, which reads out programs stored in A ROM 2303 for generating sentences and executes the programs. The component 2302 is a memory area in a RAM for storing the sentences being processed. The component 2304 is an input unit including a keyboard, tablet, mouse and another data input unit connected to hand-held data storage apparatuses, such as a floppy disk drive. The component 2305 is a display unit, such as CRT display and liquid crystal display. What is stored in ROM 2303 is a set of document generation programs, specifically provided in accordance with the present invention, for interpolating omitted characters and/or words in an input sentence and for generating and editing the vocabulary dictionary with learned words. In addition, in case the input unit 2304 is formed as a hand-written character recognition apparatus, there are programs for extracting and recognizing strokes for a handwriting recognition operation. The component 2306 is an external data storage apparatus composed of hard disk drives which contains a vocabulary dictionary used in the present invention. The sentence interpolation process for interpolating omitted characters and/or words in an elliptic sentence, the dictionaries used in the sentence interpolation process and the process for generating and editing the dictionaries with learned words in the present invention will be described thereinafter.

Figure 1:
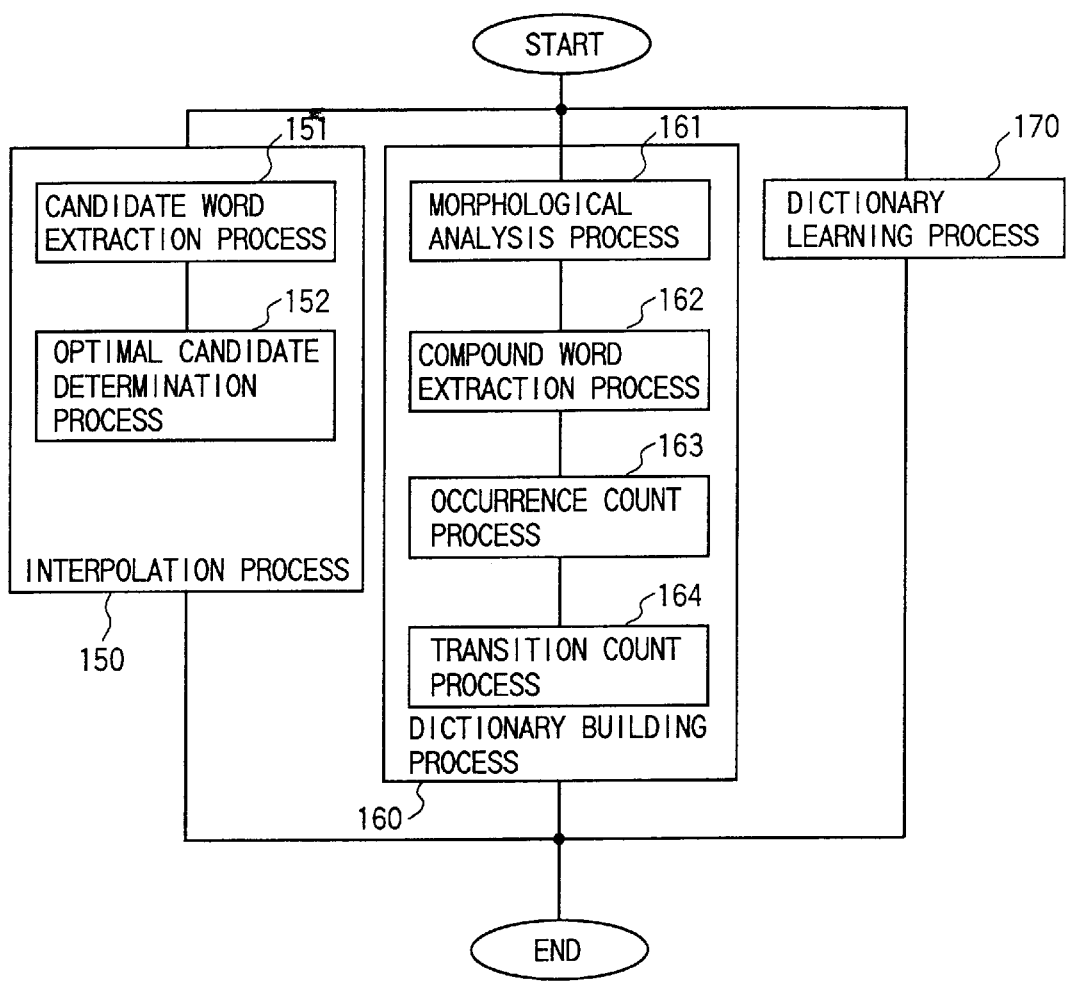
FIG. 1 is a process diagram shows an overall which procedure according to the present invention.
Figure 2:
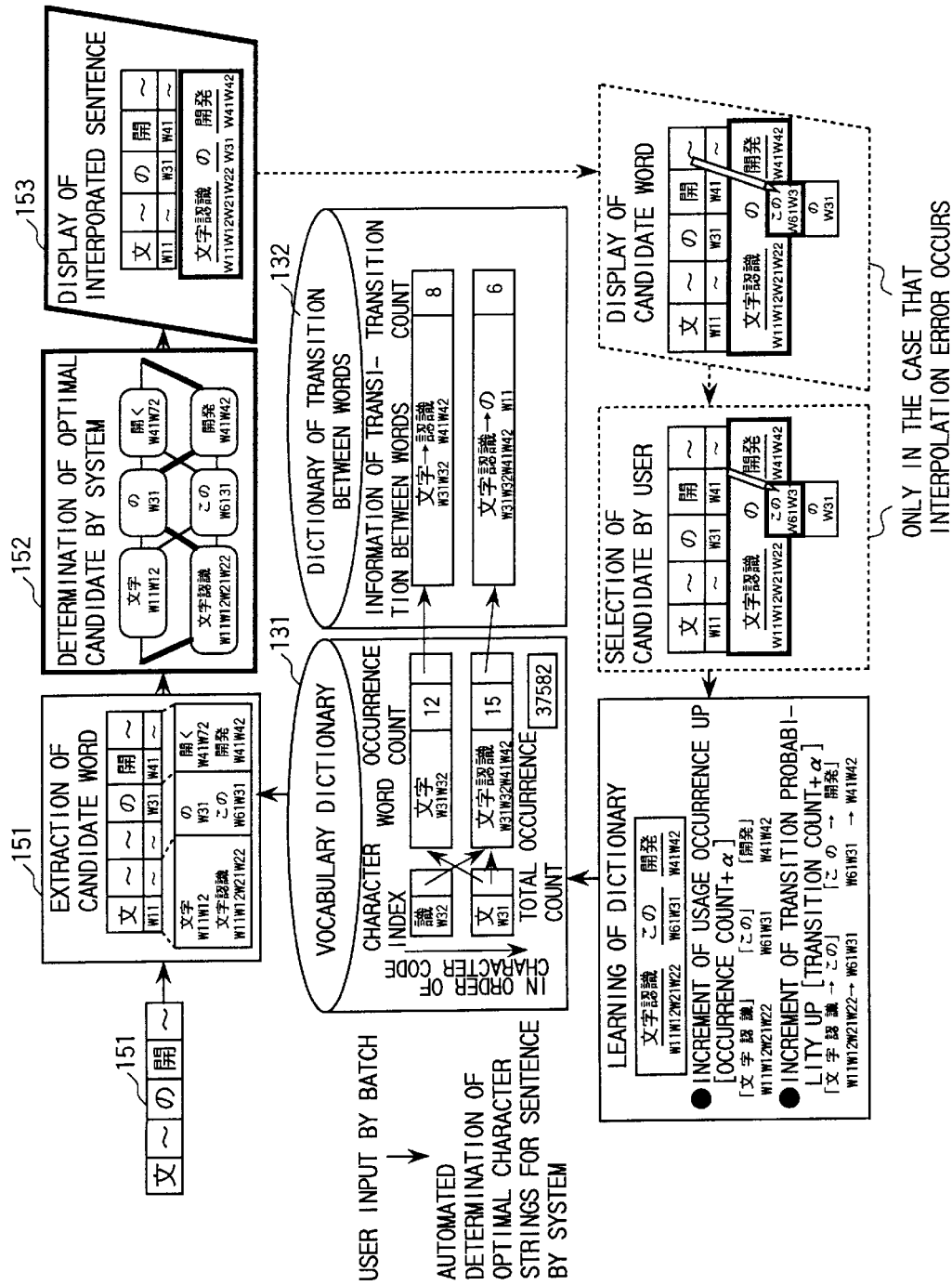
FIG. 2 is a process diagram which shows an overall operation according to the present invention.

FIG. 1 shows an overall procedure for interpolating an elliptic sentence and for generating and editing the dictionaries with learned words. FIG. 2 shows a schematic diagram of operations carried out by this procedure.

This procedure is composed of an interpolation process 150 for interpolating omitted characters and/or words in an input word or sentence and for displaying the completed word or sentence, a dictionary generation process 160 for generating the dictionary used in the interpolation process and a dictionary learning process 170 for updating the dictionary for increasing the operating performance. The interpolation process 150 further comprises a candidate word extraction process 151 which extracts elliptic symbols included in the word or sentence including omitted characters and/or words and extracts the candidates of omitted words; an optimal candidate determination means 152 for extracting an optimal word from the extracted candidate words and completing the interpolated sentence; and a display control process 153 (FIG. 2) for controlling the display of the interpolated sentence.

The dictionary generation process 160 is composed of a morphological analysis process 161 for decomposing the input sentence into individual words, a syntax analysis process 162 for analyzing the structure of the sentence on the basis of the individually separated words, an occurrence count process 163 for counting the occurrence of words on the basis of the result of the morphological analysis process 161 and a transition count process 164 for counting the count of transition of words on the basis of the result of the syntax analysis 162.

A vocabulary dictionary 131 for interpolating the sentence in the interpolation process 150; a transition dictionary 132 along with rules for determining optimal words and rules used for generating the dictionary are stored in the memory apparatus 2306 (HDD).

FIG. 2 shows overall operations of the elliptic sentence interpolation and recognition apparatus. In FIG. 2, a symbol wij is assigned to and shown below the individual Japanese character. This symbol implies that this apparatus can be applied to sentences other than Japanese language, for example, English sentences. The suffix ii represents an individual character and the suffix j represents an individual word. A set of symbols w with an identical number ii represents a single word. Thus, for example, a unique number j is assigned to each individual alphabetical character in the English language, and a unique number ii is assigned to an individual word. The symbol wij appearing in the figures described below has an identical meaning consistently.

Now, examples of operations of the apparatus will be described. At first, an elliptic sentence 「文〜の開〜」 input from the input unit. A symbol 「〜」 is defined as a character representing omitted characters and/or words. In the candidate word extraction process 151, words 「開く・開発」 are extracted as candidates for 「開〜」. Next, in the optimal candidate determination process 152, by referring to the vocabulary dictionary 131 describing the occurrence count representing the occurrence of words and the dictionary of transition between words describing the transition count between words which represent the occurrence of a transition between words, optimal words in view of the context of a sentence are determined from among the candidate words extracted in the candidate word extraction process 151. A display operation of the sentence with its omitted characters and/or words interpolated in the above manner onto the display unit is controlled by the display control process 153. In case the interpolated sentence is different from that expected by the user, the user modifies the undesired part of the interpolated sentence. In case the user finds that the interpolated sentence contains an undesired part, the user specifies the undesired word by an input operation through the input unit 2304. In accordance with this user's input operation, the dictionary learning process 170 is started and the candidate characters for the word are specified by the display control process 153. For the candidate characters, the words obtained by the candidate word extraction process 151 are displayed. The user selects his or her desired word from among the words displayed as candidate words. According to the words selected by the user's input operation, the usage occurrence of the word in the vocabulary dictionary and the transition probability in the dictionary of transition between words are modified by the dictionary learning process 170.

Next, the individual processes will be described.

Dictionary Building

At first, the dictionary building process 160 for building the vocabulary dictionary 131 and the dictionary 132 of transition between words used for interpolation of the omitted characters in the interpolation process 150 will be described.

Figure 3:
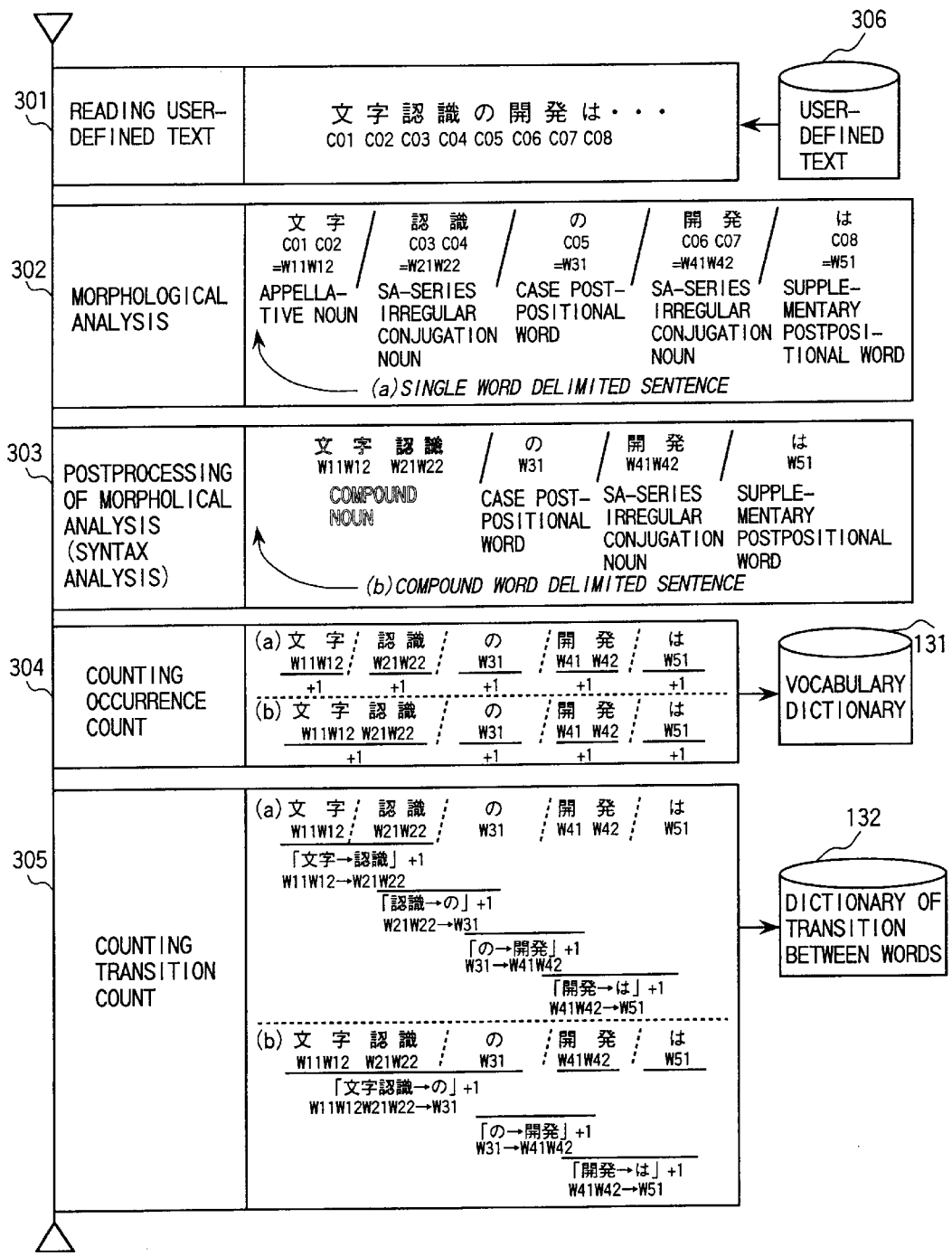
FIG. 3 is a flowchart of the operations for building the dictionary of the present invention.

FIG. 3 is a flowchart showing an example of the process for building dictionaries. In this example, what is described is a case wherein a user builds a dictionary using sentences defined by the user beforehand. At first, the sentence defined beforehand is read out from the input unit 2304, if it is stored in the external storage medium, or is read out from the memory apparatus 2306, if it is stored in the memory apparatus 2306 (step 301). In this example, what is described is a case in which a sentence is 「文字認識の開発は…」 in the Japanese language. Next, in the morphological analysis process 161, the read-out sentence is decomposed into individually separated words by morphological analysis based on the rules stored beforehand in the memory apparatus 2306, and a sentence composed of delimited individual words, that is, a word based delimited sentence, is generated (step 302). In the morphological analysis process 161, the input sentence 「文字認識の開発は…」 is transformed into a set of delimited individual words, 「文字／認識／の／開発／は」, and each part of speech in this sentence is interpreted as 「文字」 (noun) ／認識 (Sa-series irregular conjugation noun) ／の (case postpositional particle) ／開発 (S-series irregular conjugation noun) ／は (supplementary postpositional particle)].

In the syntax analysis process 162, the sentence read out from the input unit 2304 or the memory apparatus 2306 is parsed according to the rules stored beforehand in the memory apparatus 2306, and a compound word based delimited sentence including compound words, such as a compound noun, is generated (step 303). As for the input sentence 「文字認識の開発は…」, 「文字—認識」 is recognized as a compound noun including a noun-noun structure, and a compound word based delimited sentence 「文字認識／の／開発／は」is obtained. Next, in the occurrence count process 163 and the transition count process 164, by referring to the word based delimited sentence and the compound word based delimited sentence, the occurrence count of words and compound words is measured and stored into the vocabulary dictionary 131 (step 304). In addition, the transition counts between words and the transition counts between compound words are measured and stored into the dictionary 132 of transition between words (step 305). A method of measuring the occurrence count and transition count of words will described later with reference FIG. 16.

By building dictionaries by learning both fine-grained or word-by-word delimited sentence and a coarse-grained (on the basis of a compound word) delimited sentence as described above, it will be appreciated that the dictionary can be used with higher flexibility when the user uses the dictionaries for interpolating an input sentence having omitted characters and/or words.

FIG. 4 shows examples of rules for generating a coarse-grained delimited sentence on the basis of a compound word for example. Methods for forming a coarse-grained delimited sentence structure on the basis of a compound word include the following methods.

(1) A sentence is transformed into a coarse-grained delimited sentence structure in such a way that a sequential occurrence of nouns is interpreted as a compound noun (for example, a sequence of 「文字」 (noun) and 「認識」 (noun) is interpreted as 「文字認識」 (compound noun), and that a sequential occurrence of a Sa-series irregular conjugation noun and 「する」 (Sa-series irregular conjugation verb) is interpreted as a compound verb (for example, a sequence of 「認識」 (Sa-series irregular conjugation noun) and 「する」 (Sa-series irregular conjugation verb) is interpreted as 「認識する」 (Sa-series irregular conjugation verb)).

(2) A sentence is transformed into a coarse-grained delimited sentence structure in such a way that a part delimited by a postpositional particle and an auxiliary verb is recognized as a single phrase.

A single delimited unit may be defined in response to the user's preference. In a case where the sentence is described in a language other than the Japanese language and grammatical rules other than those described above are applied, the scheme described above can be adopted by properly modifying the rules described above.

FIG. 5 shows structures of the vocabulary dictionary 11 and the dictionary 132 of transition between words, both of which build by the method described with reference to FIG. 3. The words (and their compound words) appearing in the sentence and their occurrence counts, and total occurrence count of whole words are stored in the vocabulary dictionary 131. Information on the transition between words and the transition count appearing actually in the sentence are stored in the dictionary 132 of transition between words. For easiness of access to the dictionaries, it is desired to arrange those data in the order of the character code. FIG. 5 shows a result of measuring the occurrence count of words (and compound words) and a transition count between words (and compound words) in the text string 「文字認識の開発」. Substantially, the present invention can be realized only by identifying those words, the occurrence count of words (occurrence frequency), information on transition between words and the transition count (transition probability). However, it is possible to form the dictionaries with an index as shown in FIG. 6 in order to facilitate the processes.

Figure 6:
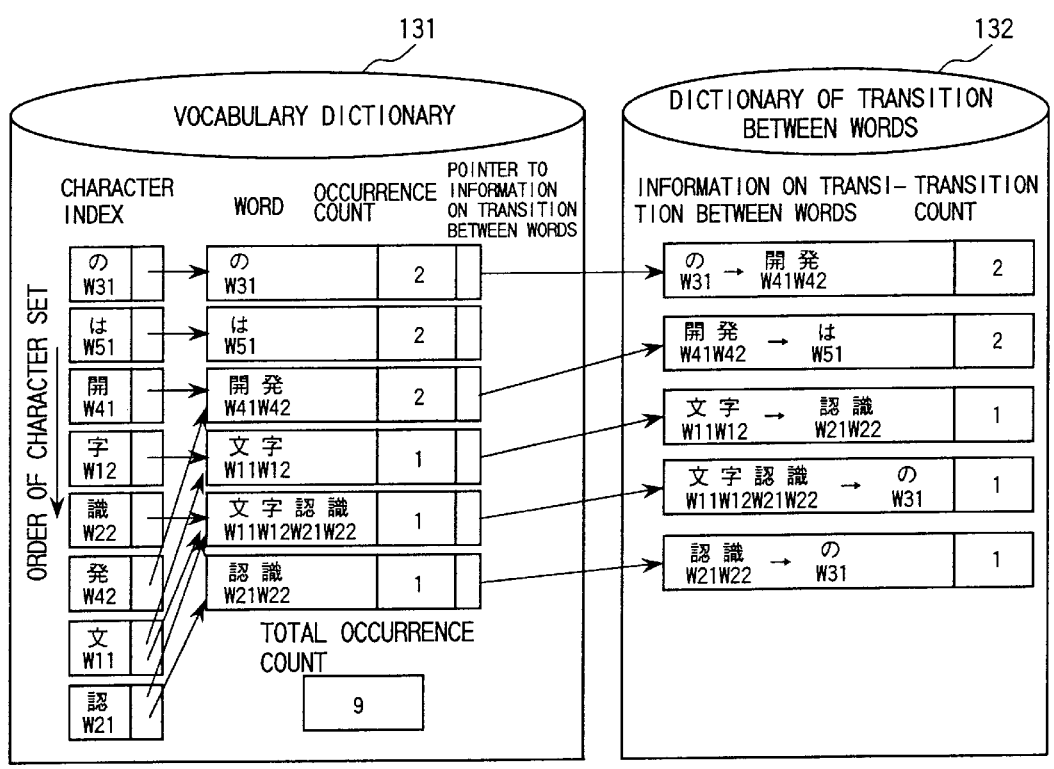
FIG. 6 shows examples for the vocabulary dictionary and the transition dictionary.

FIG. 6 shows structures of the indexed vocabulary dictionary 131 and the indexed dictionary 132 of transition between words. A major difference from the structure in FIG. 5 resides in the fact that an index (pointer) is defined in order to refer to the information on words in the vocabulary dictionary 131 and the information on transition between words in the dictionary 132 of transition between words. A character contained in the individual word is defined as an index (pointer) in the vocabulary dictionary 131, and is arranged in the order of the character codes. With this configuration, a word having specified characters (characters before and after the elliptic symbol) can be found immediately. It can be seen in the example shown in FIG. 6 that words containing a character 「字」 are 「文字」 and 「文字認識」. Since the information on an individual word in the vocabulary dictionary 131 has an index (pointer) for referring to the information on transition between words that contains this word, it is also easy to refer to the information of transition between words in the dictionary 232 of transition between words after referring to the vocabulary dictionary 131. In this example, it is found that the word 「する」 comes after the word 「文字」.

As described above, the vocabulary dictionary 131 and the dictionary 132 of transition between words used in the present invention can be formed.

Interpolation Process

Figure 7:
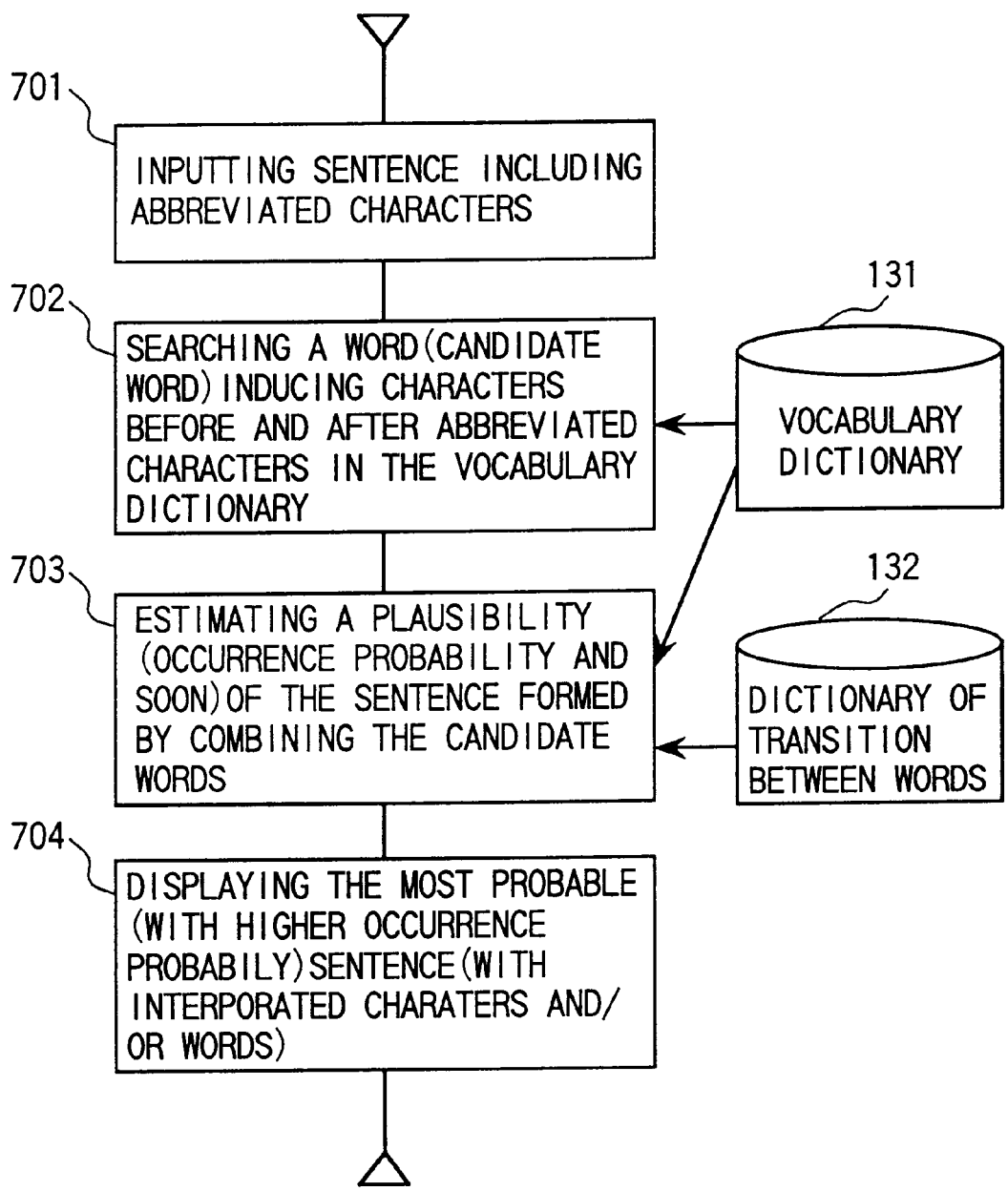
FIG. 7 is a flowchart of the interpolation process for an elliptic sentence.

Next, an interpolation process 150 for interpolating characters and/or words in a sentence containing omitted characters and/or words will be described. FIG. 7 shows a flowchart of the operation of the interpolation process 150.

At first, a sentence including elliptic symbols is input by the user's input operation through the input unit 2304 (step 701). Next, the candidate word extraction process 151 obtains plural words (or single word) (candidate word) containing character(s) before and after the elliptic symbol by referring to the vocabulary dictionary 131 (step 72). Next, in the optimal candidate determination process 152, the plausibility (defined as occurrence probability and so on) of the sentence constructed by combining plural candidate words is estimated by referring to the occurrence count (usage frequency) of the word described in the vocabulary dictionary 131 and to the transition count (transition probability) between words described in the dictionary 132 of transition between words. Finally, the sentence (the sentence with omitted characters and/or words being interpolated) determined to be most probable (with the highest occurrence probability) is displayed in the optimal candidate determination process 152 (step 704). What is described above is a basic scheme. Among those processes, the candidate word extraction process 151 and the optimal candidate determination process 152 are described in detail.

Figure 8:
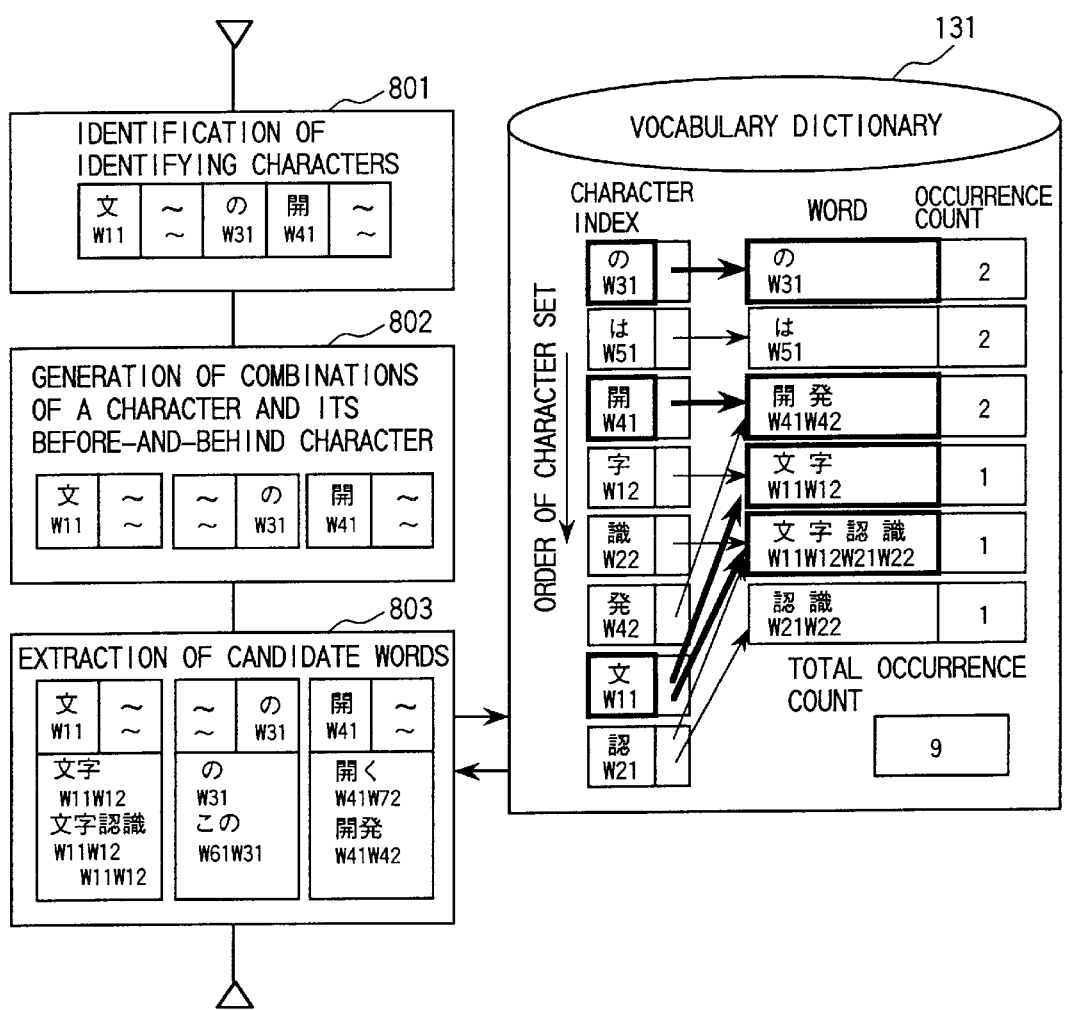
FIG. 8 is a flowchart of the candidate word extraction process.

FIG. 8 shows a flowchart describing detail procedures of the candidate word extraction process 151 and its operation.

At first, a part including elliptic symbols in the input sentence is searched (step 801). In this step, since the symbol 「～」 is defined as an elliptic symbol, a symbol 「～」 between 「文」 and 「の」, and a symbol 「～」 after 「開」 are extracted. Next, a set of characters including the elliptic symbol and its before and after characters are generated (step 802). In this example, the elliptic symbol 「～」 between 「文」 and 「の」 may be interpreted as either a part of the word 「文～」 or a part of the word 「～の」 (and furthermore, may be interpreted as a part of the word 「文～の」. The individual candidate words for each of the generated words 「文～」 and 「～の」 are extracted by referring to the vocabulary dictionary 131 (step 803). If the string 「文～の」 forms a single word, a word extracted for 「文～」 and a word extracted for 「～の」 are identical to each other. In this case, those candidate words are treated as a single group, and its probability is increased when estimating the probability of words later. This will be described in detail with reference to FIG. 14 later. Since the words in the vocabulary dictionary 131 are indexed with individual characters contained in the individual word, as described in the structure of the vocabulary dictionary 131 shown in FIG. 6, the candidate words (words containing characters 「文」「の」「開」) for interpolating the elliptic symbols contained in the parts 「文～」「～の」「文～の」 can be obtained immediately by referring to the vocabulary dictionary 131.

FIG. 9 shows a flowchart describing detail procedures of the optimal candidate determination process 152.

By the process shown in FIG. 8, the candidate words for interpolating the elliptic symbols are obtained by extracting words for interpolating the elliptic symbols from the vocabulary dictionary. In this example, 「文字・文字認識」「の・この」 and 「開く・開発」 are obtained as candidate words. The number of sentences obtained by combining those candidate words is 2 to the power 3, that is, 8, which include 「文字 の開く」「文字 の開発」「文字 この開く」「文字 この開発」 「開」「文～」「開」の開発」「開」この開く」 and 「開」この開発」). In the optimal candidate determination process 152, the plausibility of those individual sentences is estimated. As for the measure of plausibility, the occurrence probability of the sentence is estimated. The occurrence probability of sentences composed of a series of words, w1, w2, . . . and wn (in which wi is the i-th word) is expressed in terms of the occurrence probability of words and the transition probability between words as in the expression, Occurrence Probability (w1 w2 . . . wn)=Occurrence Probability (w1)×Transition Probability (w2|w1)× Transition Probability (w3|w2)× . . . × Transition Probability (wn|wn−1).

The occurrence probability of a word and the transition probability between words can be obtained by the occurrence count described in the vocabulary dictionary 131 and the transition count between words described in the dictionary 132 of transition between words. For example, the occurrence probability of word wi and the transition probability between word wi−1 and word wi can be expressed as in:

Occurrence Probability (wi)=Occurrence Count (wi)/ Total Occurrence Count, and

Transition Probability (wn|wn−1)=Transition Count (wn|wn−1)/Occurrence Count (wi−1).

Figure 10:
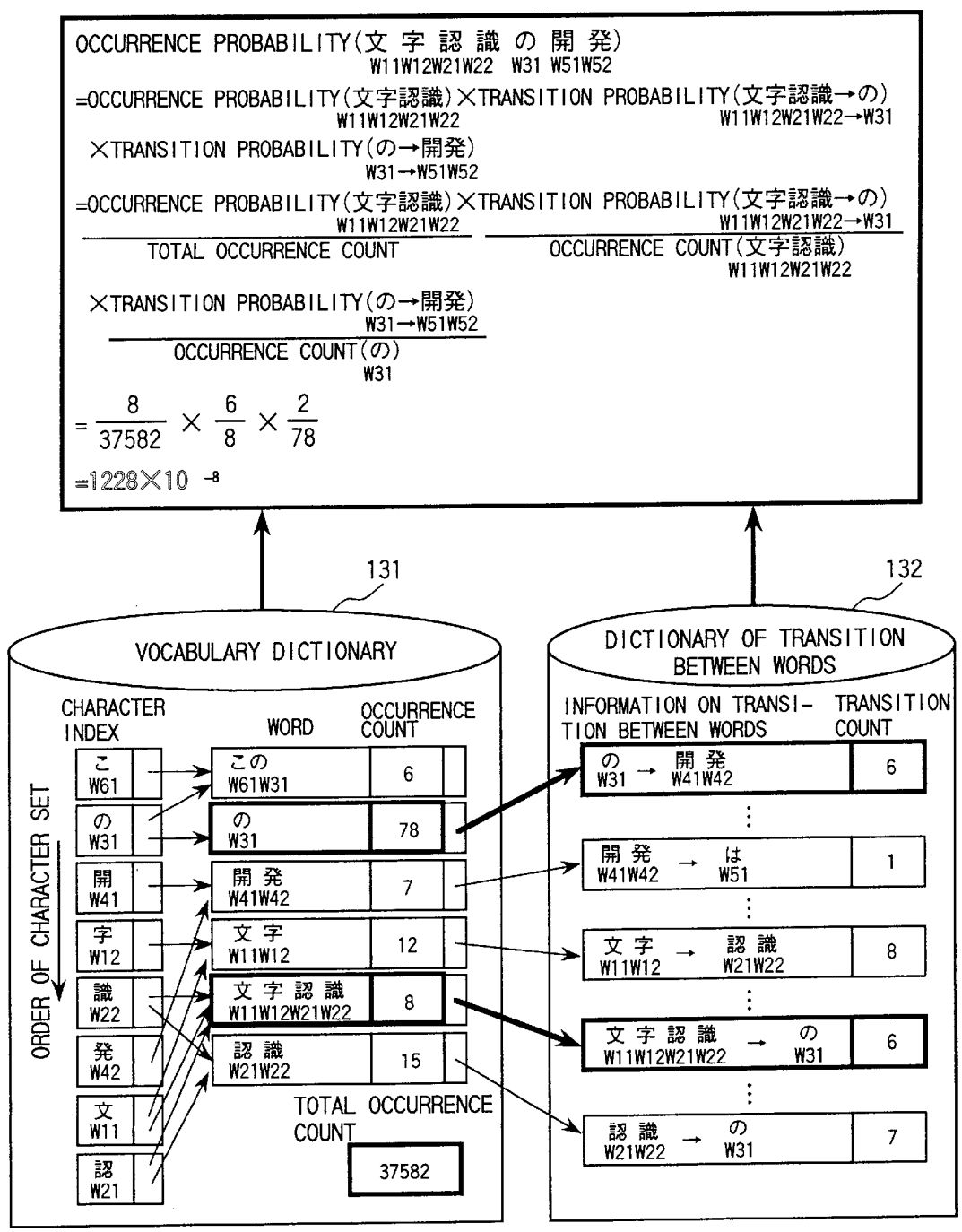
FIG. 10 is a diagram which shows a scheme for the determination of the optimal candidate.

FIG. 10 shows an estimation of the occurrence probability of the character string (sentence) 「開」の開発」, in which, by referring to the vocabulary dictionary 131 and the dictionary 132 of transition between words, the computational result is obtained as in:

Occurrence Probability (文字認識 の 開発)=Occurrence Probability (文字認識)×Transition Probability (文字認識→の)×Transition Probability (の→開発)=(Occurrence Count (文字認識)/Total Occurrence Count)×(Transition Count (文字認識→の)/Occurrence Count (文字認識))×(Transition Count (の→開発)/Occurrence Count (の))=(8/37582)×(6/8)×(2/78)=1228×10⁻⁸.

In a similar manner, the occurrence probability for another character string (sentence) is obtained, and the sentence having the highest occurrence probability is a result of judgment of the optimal interpolated sentence (in this case, the optimal interpolated sentence is 「開」の開発」).

As described above, the apparatus of the present invention determines the optimal word in considering the context of the sentence including the elliptic symbols, and the optimal word (as the first candidate) is displayed on the display unit 2305 by the display control process 704. It is possible to display the second and third candidate words at the same time.

So far, since the user does not need to select a desired word one by one from among from many candidate words, and he or she inputs the sentence by inserting elliptic symbols for the parts representing omitted characters and/or words in long words, the system can automatically select an optimal result for interpolating an elliptic sentence and display the completed sentence. Owing to this system operation, the user can continuously input the character strings without his or her thought being interrupted (due to repetitive requests asking the user to specify the candidate words and/or characters), and thus, the user's operability is remarkably increased.

Dictionary Learning

Next, what is described is an automated learning mechanism for a dictionary which enables the dictionary to accommodate new words and their definitions and revise existing words and their definitions in response to the user's sentence input and his or her preference.

Figure 11:
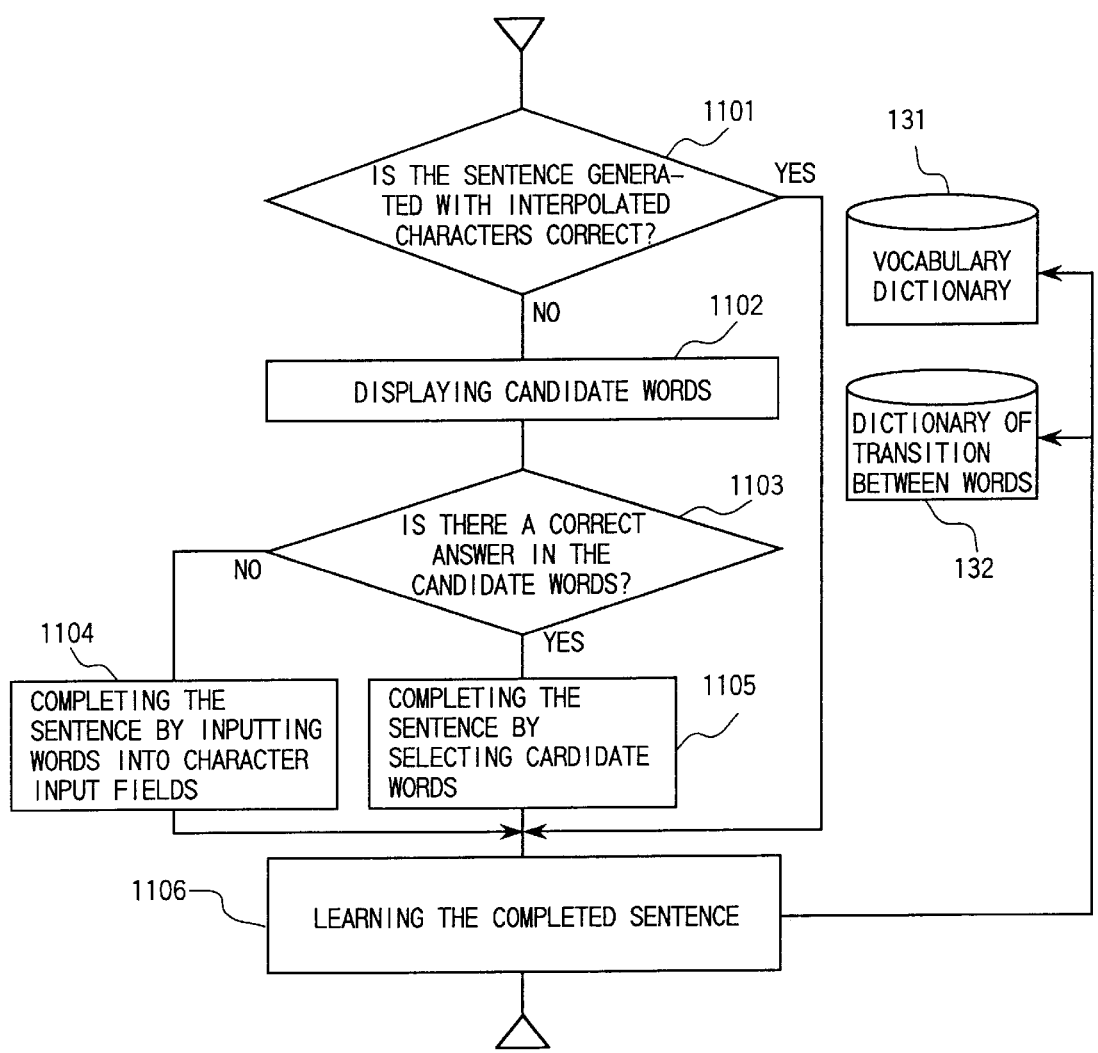
FIG. 11 is a flowchart of the dictionary building process.

FIG. 11 shows a flowchart of the procedure of the dictionary learning process 170 for building a dictionary.

At first, whether the interpolated sentences obtained by the interpolation process 150 is correct or not is judged (step 1101). Judgment whether the interpolated sentences is correct or not is done by using one of the following methods or combining them. The first method is for a case wherein the user inputs a new sentence, and the input of the interpolated sentence is judged to be correct. The second method is for a case wherein the user's input is not detected for a definite period of time, the interpolated sentence is judged to be correct. The third method is for a case where the interpolated sentence is judged to be correct due to the user's interactive verification of the interpolated sentence and his or her input of the judgment result that the interpolated sentence presented to the user is correct. For example, in the third method, in case a display object accepting the user's confirmation judgment is presented to the user on the display, and the user directs this display object interactively, the interpolated sentence is judged to be correct. If the interpolated sentence is judged to be correct, learning by the dictionary is processed by using this interpolated sentence (step 1106). The occurrence count and transition count of the word appearing in the completed sentence are measured, and the occurrence count and transition count of the word defined in the vocabulary dictionary are incremented (in this case, the morphological analysis is no longer necessary because the delaminated positions for the individual words in the sentence are already clarified).

On the other hand, in case the interpolated sentence is judged to contain errors, the user is prompted to indicate, using a pen, a keyboard or a mouse, the part of the interpolated sentence which he or she wants to modify, and then the dictionary learning process 170 will display candidate words in response to the user's operation (step 1105). If a desirable word is contained in the displayed candidate words, the designated sentence is completed by using the word selected by the user from among the candidate words (step 1106). In case a desirable word is not contained in the candidate words presented by the dictionary learning process 170, the user is prompted to input a correct word by using a pen or a keyboard (step 1104). Then, the interpolated sentence with its correction completed, if necessary, is learned (step 1106). The occurrence count and transition count of the word appearing in the completed sentence are measured, and the occurrence count and transition count of the word defined in the vocabulary dictionary are incremented (in this case, the morphological analysis is no longer necessary because the delaminated positions for the individual words in the sentence are already clarified). So far, as the dictionary is repeatedly trained by learning new words and their definitions, a dictionary capturing the user's preference can be built up while the user uses the elliptic input character interpolation recognition apparatus.

Figure 12:
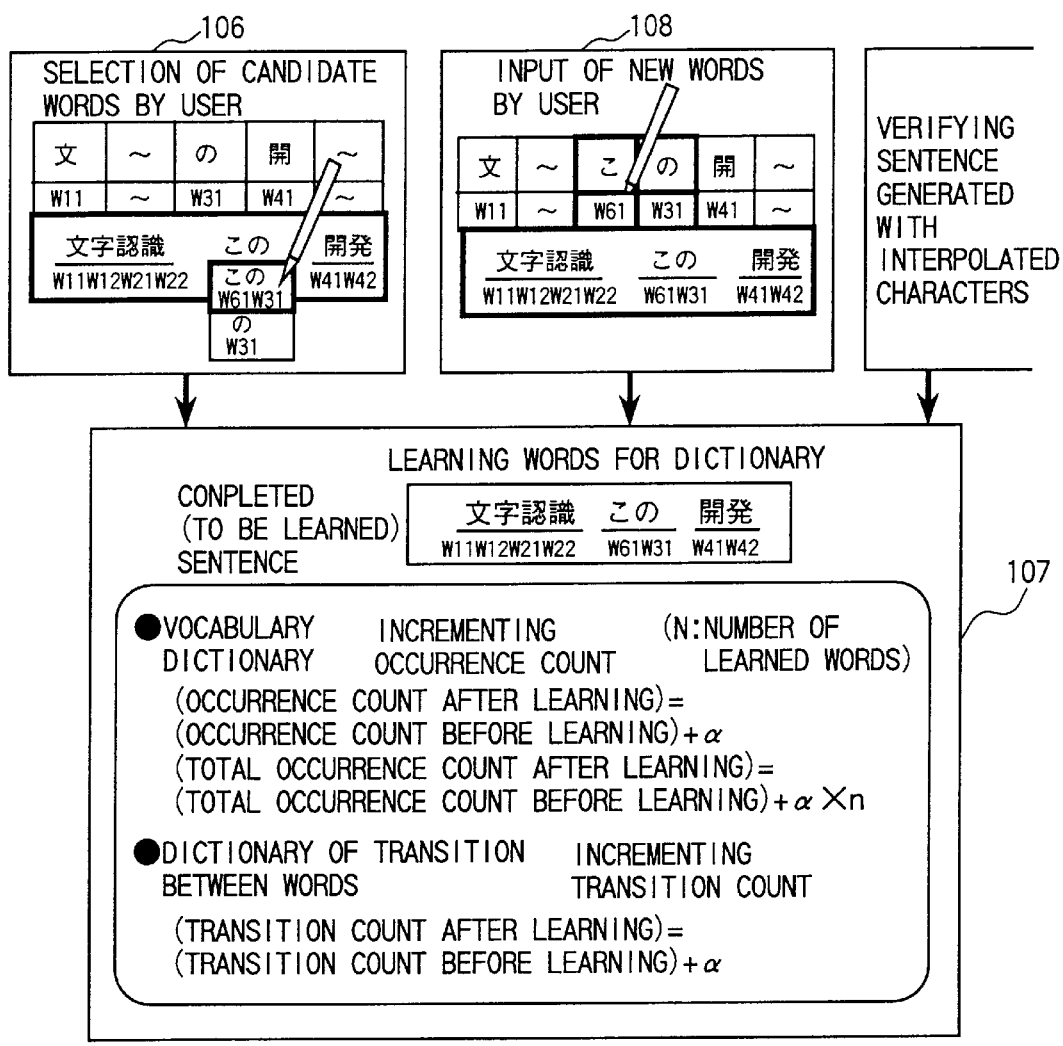
FIG. 12 is a diagram which shows a scheme for building the vocabulary dictionary and the transition dictionary.

By referring to FIG. 12 and FIG. 13, the learning step (step 1106) of the vocabulary dictionary 131 and the dictionary 132 of transition between words will be described in detail. FIG. 12 shows a case wherein the dictionary is learned by the dictionary learning process 170, and the step 1201 is a case where the interpolated sentence is judged to be not correct and a correct interpolated sentence is made by selecting the displayed candidate words or characters. The step 1202 is a case where the interpolated sentence is judged to be not correct and a correct interpolated sentence is made by the user's input of new characters, and the step 1203 is a case were the interpolated sentence is judged to be correct. Now that a correct interpolated sentence is prepared, new words and their definitions for the dictionary are learned in the dictionary learning process 170.

Figure 13:
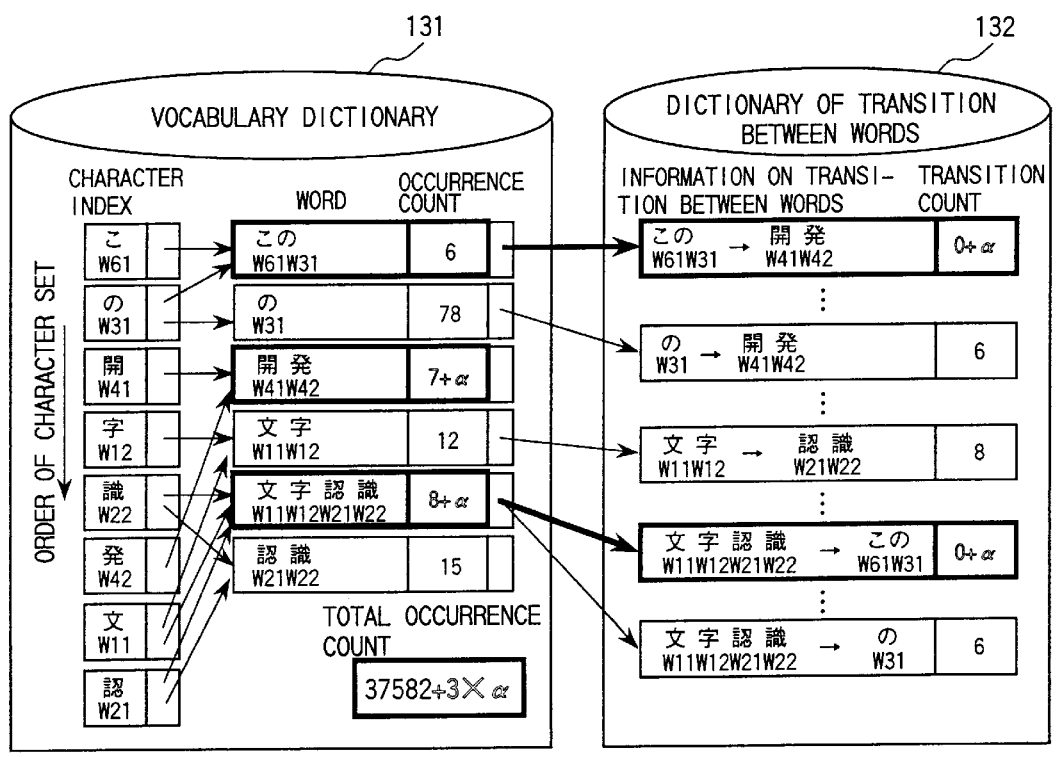
FIG. 13 is a diagram which shows a scheme for building the vocabulary dictionary and the transition dictionary.

In this embodiment, by referring to FIG. 13, what is described is a learning step with a sentence 「開」この開発」 as an interpolated sentence. When the sentence 「開」この開発」 is input, the individual occurrence counts of the words 「文字認識」「この」 and 「学習」 defined in the vocabulary dictionary 131 and the total occurrence counts of words are incremented. The occurrence count after learning is expressed as follows:

(Occurrence Count after learning)=(Occurrence Count before learning)+$\alpha$, and (Total Occurrence Count after learning)=(Total Occurrence Count before learning)+$\alpha \times n$, in which n is a number of words contained in the sentence to be learned.

Similarly, the transition counts for the transition between words 「文字認識」→この」 and 「この→開発」 defined in the dictionary 132 of transition between words are incremented. The occurrence count before learning is expressed as follows:

(Transition Count after learning)=(Transition Count before learning)+$\alpha$, in which $\alpha$ is a value of the occurrence count to be incremented at a single learning step and can be determined so as to satisfy the condition, $\alpha>0$. The value of $\alpha$ may be taken to be larger in order to increase the learning effect, or the value of $\alpha$ may be taken to be smaller in order to learn slowly.

There are several methods used for learning user's input sentences sequentially. FIG. 14 shows rules for learning dictionaries in which the occurrence count and the transition count are normalized sequentially every time when learning occurs. In this method, as the occurrence count and the transition count for the whole data are normalized sequentially, the range of the occurrence count and the transition count does not exceed the allowable memory range in the memory apparatus even if the number of learning incidences increases. The occurrence count and the transition count after learning are expressed as in the following. At first, the occurrence count of the words to be learned (appearing the user's input sentence) is expressed as follows:

(Occurrence Count after learning)=((Occurrence Count before learning)+$\alpha$)×(S/(S+$\alpha$)), and (Total Occurrence Count after learning)=((Total Occurrence Count before learning)+α)×(S/(S+α)).

The occurrence count of the word not to be learned (not appearing the user's input sentence) is only normalized and, thus is expressed as follows:

(Occurrence Count after normalization)=(Occurrence Count before normalization)×(S/(S+α)).

Next, the transition count between words to be learned (appearing in the user's input sentence) is only normalized and, thus is as follows:

(Transition Count after learning)=((Transition Count before learning)+α)×(T/(T+α)).

The transition count between words not to be learned (not appeared in the user's input sentence) is only normalized and thus, is expressed as follows:

(Transition Count after normalization)=(Transition Count before normalization)×(T/(T+α)).

In the above expression, α is a value of the occurrence count to be incremented at a single learning step and can be determined so as to satisfy the condition, α>0. The value of α may be taken to be larger in order to increase the learning effect, or the value of α may be taken to be smaller in order to learn slowly. In the above expression, by making the value of S lower than the maximum number to make it possible to memorize the occurrence count and by making the value of T lower than the maximum number to make it possible to memorize the transition count, the normalization operation can be done without exceeding the memory range (in which, the calculated amount for sequential normalization becomes larger).

Next, a dictionary learning method with normalization in which normalization is processed in batch described. The rules for this process are shown in FIG. 15. This method is such that normalization is applied to the basic learning rules shown in FIG. 14 if necessary (when the number of learning incidents may exceed the allowable memory numbers). The operation based on this method will be is described. At first, (1) in case that normalization is not required normally, that is, the occurrence count and the transition count do not exceed their maximum allowable memory ranges, the following expressions are applied in a similar manner to that shown in FIG. 13.

(Occurrence Count after learning)=(Occurrence Count before learning)+α, and (Total Occurrence Count after learning)=(Total Occurrence Count before learning)+α×n, in which n is a number of words contained in the sentence to be learned.

(Transition Count after learning)=(Transition Count before learning)+α.

In the above expression, α is a value of the occurrence count to be incremented at a single learning step and can be determined so as to satisfy the condition, α>0. The value of α may be taken to be larger in order to increase the learning effect, or the value of α may be taken to be smaller in order to learn slowly.

Next, (2) in case that normalization is required, that is, the occurrence count and the transition count may exceed their maximum allowable memory ranges, a value w for normalization is multiplied to both of the occurrence count and transition count of the learned words and the occurrence count and transition count of the words not yet learned, and then those counts are normalized. Thus, the occurrence count of the word to be learned (the word appeared in the user's input sentence) is expressed as follows:

(Occurrence Count after learning)=((Occurrence Count before learning)+α)×w, and (Total Occurrence Count after learning)=((Total Occurrence Count before learning)+α×n)×w.

The occurrence count of the word not yet learned is expressed as follows:

(Transition Count after normalization)=(Transition Count before normalization)×w.

The transition count between learned words (transition between words appeared in the user's input sentence) is expressed as follows:

(Transition Count after learning)=((Transition Count before learning)+α)×w.

The transition count between words not yet learned (transition between words not appeared in the user's input sentence) is expressed as follows:

(Transition Count after normalization)=(Transition Count before normalization)α×w, in which w is a normalization constant, which is defined so that 0<w<1. In this method, as a normalization process is executed only if it is required (in case that the occurrence count and the transition count may exceed their maximum allowable memory ranges), the number of normalization processes to be executed will be as small as possible.

According to the above described embodiment, an elliptic sentence interpolation and recognition apparatus can be so configured that the apparatus may have a learning mechanism with which the dictionaries (the vocabulary dictionary 131 and the dictionary 132 of transition between words) used for interpolating the elliptic symbols can be revised in response to the user's preference while the user uses the dictionaries.

Figure 16:
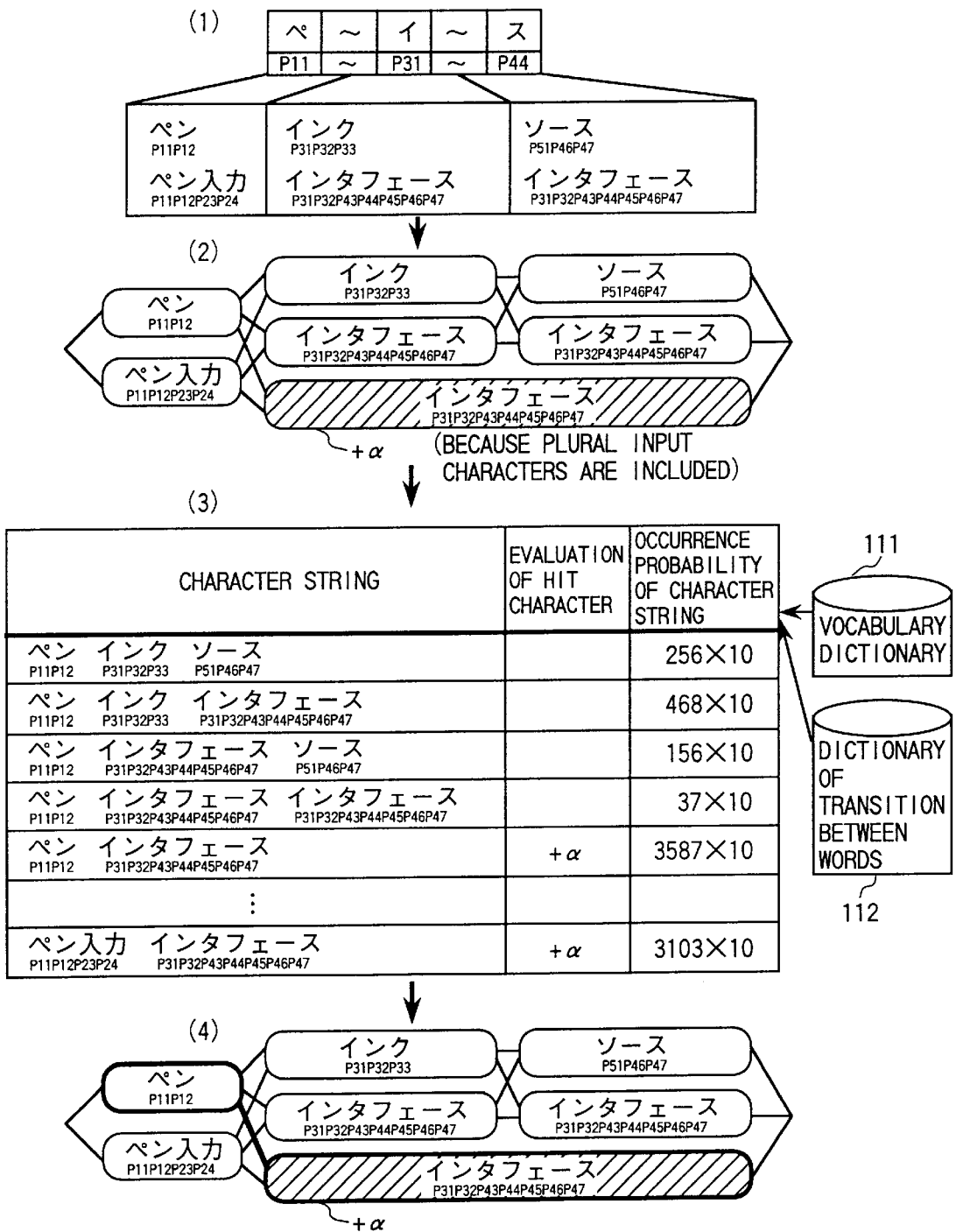
FIG. 16 is a diagram which shows a procedure of the operations for making an interpolated sentence.

The basic procedures in the elliptic sentence interpolation and recognition apparatus have been described in connection with the above embodiment. Next, functions for extraction of words in special cases, determination of optimal candidate words and selection of a candidate word will be described. In the following, special cases means that plural characters in the candidate words are included in the user's input. FIG. 16 is referred to for the following description.

FIG. 16 shows a case of building an interpolated sentence in response to the user's input 「ペ〜イ〜ス」.

The candidate word extraction process 151 responds to this user's input and generates character strings 「ペ〜」「〜イ〜」「〜ス」, each including elliptic symbols, and then extracts the candidate words corresponding to those character strings from the vocabulary dictionary. In this example, it is assumed that words 「ペン」「ペン入力」 are extracted for the character string 「ペ〜」, words 「インク」「インタフ ェース」 are extracted for the character string 「〜イ〜」 and words 「ソース」「インタフ ェース」 are extracted for the character string 「〜ス」.

Figure 17:
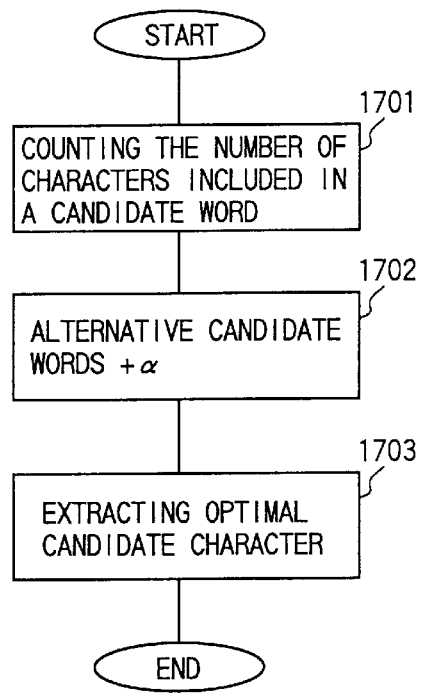
FIG. 17 is a flowchart of the operations for making an interpolated sentence.

The optimal candidate determination process 152 determines optimal candidate words based on the extracted candidate words. FIG. 17 shows a flowchart of the optimal candidate determination process 152. When the optimal candidate determination process 152 receives the candidate words and established characters (「ペ」「イ」「ス」) in the elliptic sentence from the candidate word extraction process 151, the optimal candidate determination process 152 counts the number of established characters contained in the candidate word (step 1701). For example, suppose that the candidate word is 「ペン」, since the established character 「ペ」 is included in this word, the number of established characters is 1. For all the candidate words, the number of established characters for 「ペン」 is 1, that for 「ペン入力」 is 1, that for 「インク」 is 1, that for 「インタフェース」 is 2, and that for 「ソース」 is 1. The certainty of the character string obtained by combining the candidate word having the largest number of established characters is incremented by adding α (step 1702). In this example, the candidate word having the highest number of established characters is 「インタフェース」, and the character strings obtained by combining this candidate word are 「ペン・インタフェース」, エース」インタフェース」, and then, their certainty is incremented by adding α. Next, the occurrence probability (certainty) of the character strings 「ペン・インク・ソース」「ペン・インク・インタフェース」 and エース」インタフェース」 obtained by combining the candidate words for 「ペ～」「～イ～」「ス」 is estimated by the above described method using the occurrence count of words in the vocabulary dictionary 131 and the transition count between words in the dictionary 132 of transition between words, and the estimated value for the occurrence probability and the certainty are totally estimated (step 1703). The character string having the highest estimated value (the occurrence probability and is taken to be a candidate for the interpolated sentence. In this example, the character string 「ペン・インタフェース」 is taken to be the first candidate word for the interpolated sentence.

As described above, the system can present an optimal word for the interpolated sentence by respecting the user's preference and the context of the user's input sentence.

FIG. 18 shows a method for displaying candidate words and prompting the user to select one of them in case the candidate word contains plural characters input by the user. In this example, it is assumed that the input part is formed as a tablet and the user inputs characters in hand-written manner. It is supposed that an interpolated sentence 「ペン・インタフェース」 is obtained by the process shown in FIG. 17 in response to the user's input 「ペ～イ～ス」. As described with reference to FIG. 17, the candidate words 「インク」「インタフェース」 for the part 「～イ～」, the candidate words 「ソース」「インタフェース」 for the part 「～ス」 and the candidate word 「インタフェース」 for the part 「～イ～ス」 are obtained in response to the user's input 「ペ～イ～ス」. If the user requests display of the candidate words for 「インタフェース」 in the interpolated sentence, the candidate words 「インク」「インタフェース」 for the part 「～イ～」, the candidate words 「ソース」「インタフェース」 for the part 「～ス」 and the candidate word 「インタフェース」 for the part 「～イ～ス」 are displayed (FIG. 18 at (2)). The user is prompted to select one of the displayed candidate words. In the example shown in FIG. 18 at (3), the word 「インク」 is selected for the part 「～イ～」 and the word 「インタフェース」 for the part 「～ス」 are selected. As shown in FIG. 18 at (4), 「ペン・インク・インタフェース」is displayed as the result. (Though not shown in the figure, supposing that the user requests display of the candidate words for 「インク」 in the interpolated sentence, the candidate words 「インク」「インタフェース」 for the 「～イ～」, the candidate words 「ソース」「インタフェース」 for the part 「～ス」 and the candidate word 「インタフェース」 for the part 「～イ～ス」 are displayed as is the case with the candidate word displayed for 「インタフェース」.

The elliptic symbol is defined to be 「～」 in the above description. It may be possible for the user to customize the definition of the elliptic symbol. In this way, the user can define the elliptic symbol by using a symbol which may be never used in his or her sentences.

Figure 19:
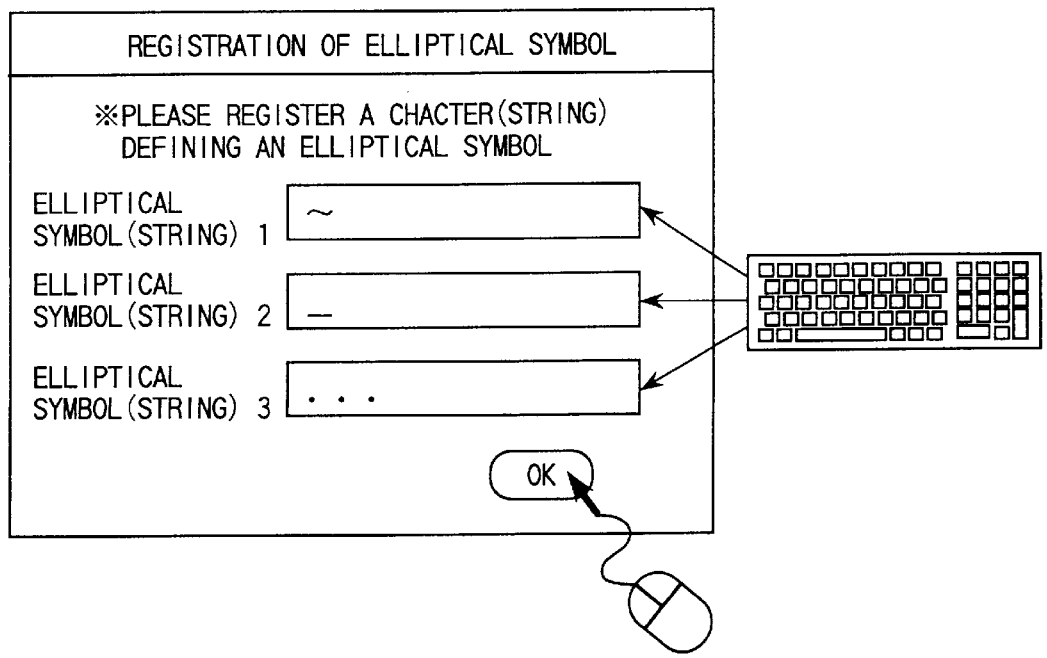
FIG. 19 is a diagram which shows a definition of elliptic symbols.

FIG. 19 shows an input example in the case of defining the elliptic symbol. In this example, the user defines three symbols 「～」, 「…」 and 「⋯」 as an elliptic symbol. (By defining such a specific character string as 「⋯」 as an elliptic character string, the elliptic symbol can be registered even in case of inputting all the characters.)

Figure 20:
FIG. 20 is a diagram which shows an application example of the present invention.

Next, some systems to which the elliptic sentence interpolation and recognition process is applied will be described. It often happens that an identical character string is input repeatedly when inputting sentences and data. By displaying often-used character strings on the palette, the user can easily input sentences only by selecting strings on the palette. FIG. 20 shows an example in which the user inputs a 10-character-length string 毎々お世話になります by using an input palette including words used frequently. FIG. 20 shows a case wherein the user can input a character string 毎々お世話になります frequently, such as one used in the heading of a business document, only by hitting a button.

In preparing a character string palette including words used frequently, character strings required for the system and used frequently by the user are obtained by using the vocabulary dictionary 131 and the dictionary 132 of transition between words described in FIGS. 5 and 6, and the obtained character strings having a designated string length (in this example, 10 characters) are displayed in order according to the higher occurrence probability.

Figure 21:
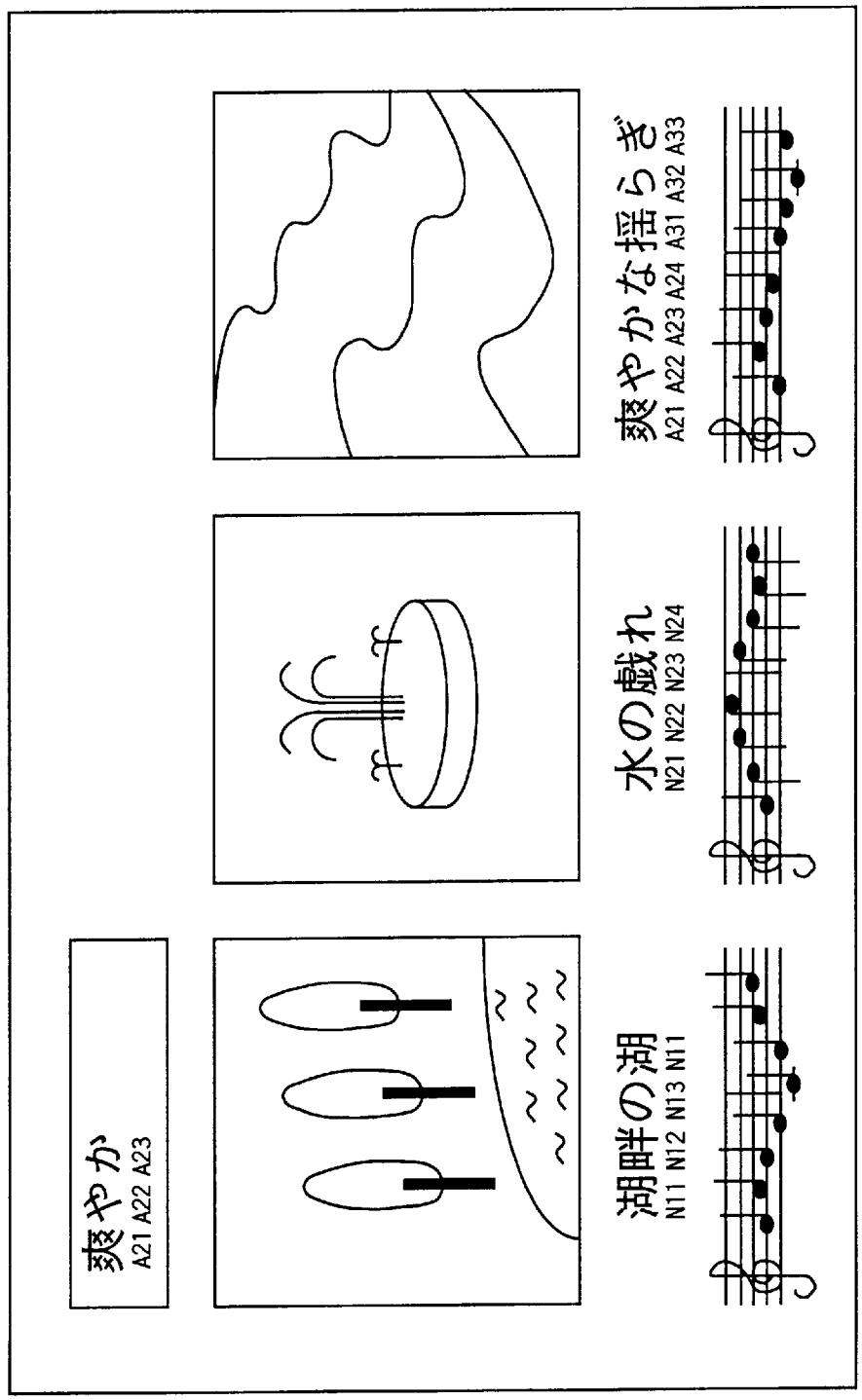
FIG. 21 is a diagram which shows an application example of the present invention.

So far, what has been described is concerns methods of inputting character strings. Next, a description will be provided for input methods for multimedia information including pictures, sounds and movies. It often happens that the user wants to use and input certain pictures and sounds when creating documents and home page contents. For example, suppose that he or she wants to input pictures and sounds which imply an exhilarating impression. In this example, what is proposed is a system in which merely by inputting a part of the character string representing the impression or object of the multimedia source, for example, 「爽～」, the user can obtain corresponding information related to the pictures and sounds matched for the input character string. FIG. 21 shows an example of this system, in which an elliptic expression 「爽～」 of the adjective 「爽やか」 representing an exhilarating feeling is input by the user, and then a matched picture and musical sound are presented to the user. Thus, the user is allowed to specify his or her desired items and then input the multimedia information easily.

Figure 22:
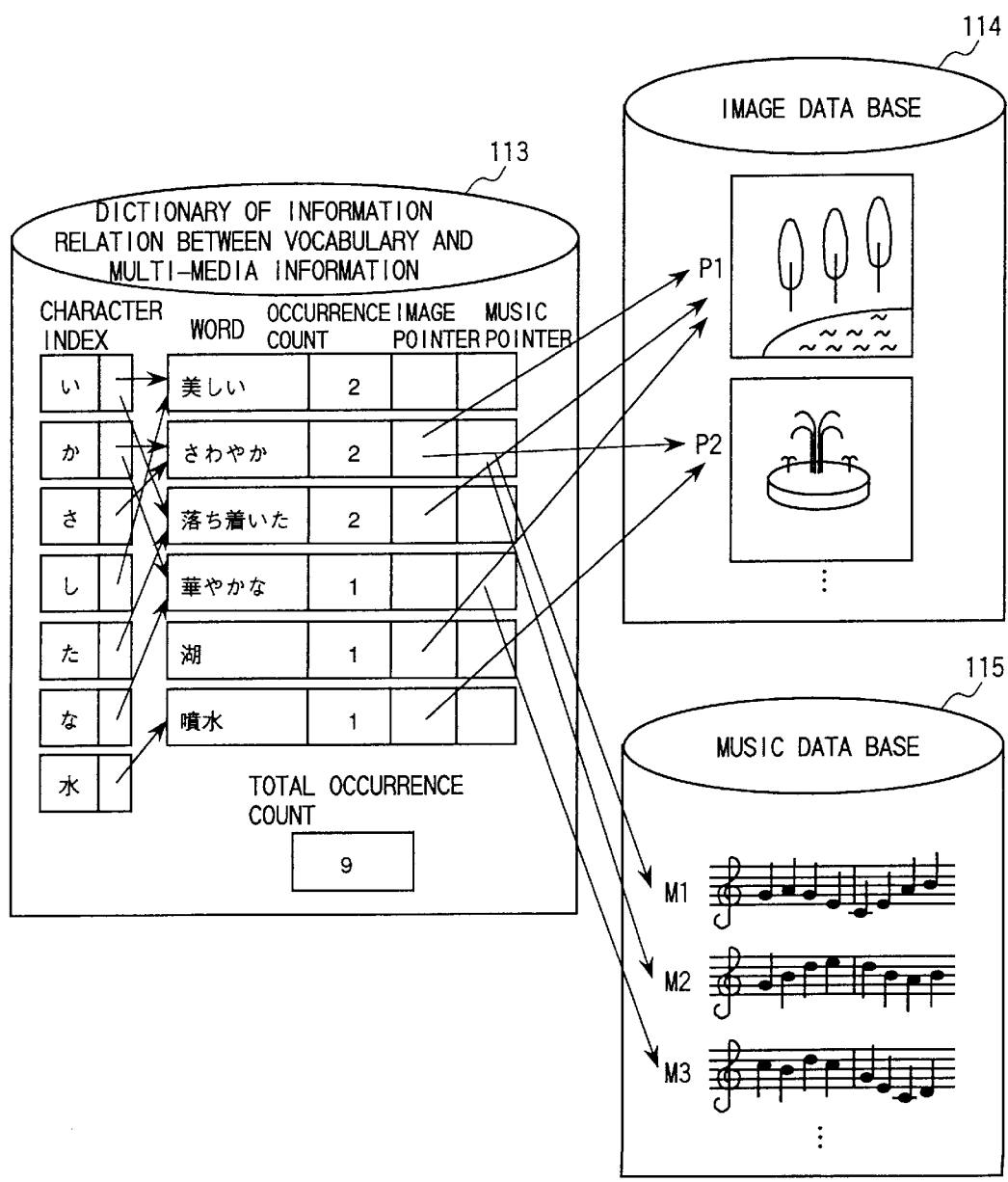
FIG. 22 is a diagram which shows the vocabulary dictionary and the transition dictionary.

The structure of the dictionary (dictionary of information indicating a relation between vocabulary and multimedia information) required to realize the above described system is shown in FIG. 22. The structure of this dictionary is similar to the structure of the vocabulary dictionary 131 and the dictionary 132 of transition between words described in FIG. 6. Though the word in the vocabulary dictionary 131 and the transition between words in the dictionary 132 of transition between words are linked to each other in the example shown in FIG. 6, the words (words representing impressions of images or sounds or defining names of themselves) are linked to the contents of the multimedia data bases 134 and 135 containing images and sounds instead of the dictionary 132 of transition between words.

By using this dictionary, if the user inputs a character string, for example, 「爽～」, a word 「爽やか」 containing a a character 「爽やか」 is obtained by referring to the character index in the vocabulary dictionary 111. The entry 「爽やか」 in the vocabulary dictionary 111 has pointers to the images and sounds representing an exhilarating feeling or impression, and thus, multimedia information which provides exhilarating images and sounds can be retrieved immediately by referring to the dictionary.

When building this dictionary, coordinate indexing between images and sounds and the words representing their impressions may be defined by the user or determined automatically by the system making it possible to recognize the impression of the individual image. In case of capturing the information on the WWW environment, as the words and/or phrases near the image contained in the information often represent the impression provided by the image, it may be possible to associate the image with the word near the image.

As described above, what can be realized is a system in which a desired multimedia information including character strings, images and sounds can be accessed only by specifying a part of the character string without inputting a complete set of a number of characters.

When the user merely inputs a sentence in a batch manner (without recognizing and selecting an individual candidate word every time when inputting the individual words in the sentence) in which elliptic symbols are inserted for specifying emitted characters and/or words, the system determines and presents optimal words for interpolating the elliptic parts. Thus, users can input sentences in a batch manner without disturbing the continuity of thought, and the operability is remarkably increased. As the dictionaries used for interpolating the elliptic characters can be built up automatically without the user's interaction and made more and more intelligent as the dictionaries are learned, the user can operate the system comfortably.

While the described embodiment represents the preferred form of the present invention, it is to be understood that changes and variations may be made without departing from the spirit of the present invention.

What is claimed is:

1. A sentence processing apparatus comprising:
   an input unit for inputting characters,
   a display unit for displaying said input characters, and
   a processing unit for converting and editing said input characters,
   wherein said processing unit includes:
      candidate word extraction means which extracts candidate words for an elliptic word by referring to a vocabulary dictionary storing a word and its usage frequency, to a dictionary of transition between words defining an information on transition between words and a probability of transition between words, and by searching the characters before and after the elliptic character included in the input sentence in the vocabulary dictionary, and
      determination means which selects a single word among said extracted candidate words by referring to said dictionary of transition between words.

2. A sentence processing apparatus according to claim 1, wherein
   said input unit includes a tablet for allowing an input of words by handwriting, and
   said processing unit includes recognition means for extracting and recognizing stroke information input by handwriting.

3. A sentence processing apparatus according to claim 1, wherein
   said processing unit includes vocabulary dictionary building means for decomposing an input sentence into individual words, and storing an occurrence count of said individual word in said sentence and said individual word into said vocabulary dictionary.

4. A sentence processing apparatus according to claim 1, wherein
   said processing unit includes means for building a dictionary of transition between words for decomposing an input sentence into individual words, and storing a transition count between said individual words in said sentence and said individual word into said dictionary of transition between words.

5. A sentence processing method comprising:
   a step of decomposing an input sentence into individual words, and storing an occurrence count of an individual word in said sentence and said individual word into a vocabulary dictionary,
   a step of storing an transition count between said individual words into a dictionary of transition between words and searching a class of a particle for said individually decomposed word,
   a step of extracting candidate words of omitted words by referring to said vocabulary dictionary on characters before and after an elliptic symbol included in said input sentence, and
   a step of determining a single word among said candidate words extracted on a basis of said dictionary of transition between words.

6. A sentence processing method comprising:
   a step of decomposing an input sentence into individual words, and storing an occurrence count of an individual word in said sentence and said individual word into a vocabulary dictionary,
   a step of storing an transition count between said individual words into a dictionary of transition between words and searching a class of a particle for said individually decomposed word,
   a step of extracting a candidate of omitted words by referring to said vocabulary dictionary on characters before and after an elliptic symbol included in said input sentence, and
   a step of determining a single word among said candidate words extracted on a basis of said dictionary of transition between words, wherein
   in a case where said determined word is found in said vocabulary dictionary, an occurrence count of said determined word is modified and said dictionary of transition between words is modified on a basis of an information on transition between words.

* * * * *